(12) United States Patent
Itakura

(10) Patent No.: US 7,639,882 B2
(45) Date of Patent: Dec. 29, 2009

(54) MOVING PICTURE DISTRIBUTION SYSTEM, MOVING PICTURE DISTRIBUTION DEVICE AND METHOD, RECORDING MEDIUM, AND PROGRAM

(75) Inventor: Eisaburo Itakura, Kanagawa (JP)

(73) Assignee: Sony Corporation, Tokyo (JP)

( * ) Notice: Subject to any disclaimer, the term of this patent is extended or adjusted under 35 U.S.C. 154(b) by 450 days.

(21) Appl. No.: 10/504,840

(22) PCT Filed: Feb. 12, 2003

(86) PCT No.: PCT/JP03/01417

§ 371 (c)(1),
(2), (4) Date: Jun. 9, 2005

(87) PCT Pub. No.: WO03/071801

PCT Pub. Date: Aug. 28, 2003

(65) Prior Publication Data

US 2005/0244070 A1    Nov. 3, 2005

(30) Foreign Application Priority Data

Feb. 19, 2002    (JP)    ............................. 2002-041395

(51) Int. Cl.
*H04N 7/173*    (2006.01)
*G06K 9/36*    (2006.01)

(52) U.S. Cl. .................. 382/232; 370/229; 375/240.01; 725/91; 725/100; 725/114; 725/131

(58) Field of Classification Search .................. 382/232
See application file for complete search history.

(56) References Cited

U.S. PATENT DOCUMENTS

| | | | |
|---|---|---|---|
| 5,515,377 A * | 5/1996 | Horne et al. ........... | 370/395.64 |
| 5,818,531 A * | 10/1998 | Yamaguchi et al. ...... | 375/240.2 |
| 6,028,634 A * | 2/2000 | Yamaguchi et al. .... | 375/240.16 |
| 6,256,346 B1 * | 7/2001 | Yamaguchi et al. .... | 375/240.12 |
| 6,266,817 B1 * | 7/2001 | Chaddha .................... | 725/146 |
| 6,317,462 B1 * | 11/2001 | Boyce .................. | 375/240.27 |
| 6,470,142 B1 * | 10/2002 | Isozaki et al. ............... | 386/124 |
| 6,473,526 B1 | 10/2002 | Enokida | |
| 6,496,980 B1 * | 12/2002 | Tillman et al. ................ | 725/90 |
| 6,510,553 B1 * | 1/2003 | Hazra .......................... | 725/87 |

(Continued)

FOREIGN PATENT DOCUMENTS

JP    62-194775    8/1987

(Continued)

OTHER PUBLICATIONS

Joseph Davies, "TCP/IP Fundamentals for Microsoft Windows", May 21, 2006, p. 3—History of TCP/IP.*

(Continued)

*Primary Examiner*—Sath V Perungavoor
(74) *Attorney, Agent, or Firm*—Finnegan, Henderson, Farabow, Garrett & Dunner, L.L.P.

(57) ABSTRACT

A moving-picture distribution system, a moving-picture distribution apparatus and method, a recording mediums, and a program capable of distributing a picture having different qualities at the same time to a plurality of users specifying the different qualities are disclosed. The present disclosure can be applied to a moving-picture distribution system for distributing moving-picture data.

12 Claims, 16 Drawing Sheets

U.S. PATENT DOCUMENTS

| | | | | |
|---|---|---|---|---|
| 6,546,144 | B1* | 4/2003 | Fukuhara et al. | 382/240 |
| 6,553,072 | B1* | 4/2003 | Chiang et al. | 375/240.25 |
| 6,836,512 | B2* | 12/2004 | Van Der Schaar et al. | 375/240.11 |
| 6,996,097 | B1* | 2/2006 | Chou et al. | 714/746 |
| 7,028,096 | B1* | 4/2006 | Lee | 709/231 |
| 7,062,096 | B2* | 6/2006 | Lin et al. | 382/232 |
| 7,072,366 | B2* | 7/2006 | Parkkinen et al. | 370/538 |
| 7,114,174 | B1* | 9/2006 | Brooks et al. | 725/105 |
| RE40,079 | E* | 2/2008 | Yamaguchi et al. | 375/240.12 |
| 7,385,921 | B2* | 6/2008 | Itakura et al. | 370/230 |
| 7,463,683 | B2* | 12/2008 | Van Der Schaar et al. | 375/240.1 |
| 2001/0026643 | A1 | 10/2001 | Yamada | |
| 2001/0028404 | A1* | 10/2001 | Fukuhara et al. | 348/384.1 |
| 2001/0040700 | A1* | 11/2001 | Hannuksela et al. | 358/261.2 |
| 2002/0009141 | A1* | 1/2002 | Yamaguchi et al. | 375/240.11 |
| 2002/0026645 | A1* | 2/2002 | Son et al. | 725/109 |
| 2002/0053053 | A1* | 5/2002 | Nagai et al. | 714/712 |
| 2002/0071485 | A1* | 6/2002 | Caglar et al. | 375/240.01 |
| 2002/0090138 | A1 | 7/2002 | Hamanaka | |
| 2002/0116473 | A1* | 8/2002 | Gemmell | 709/231 |
| 2003/0067637 | A1* | 4/2003 | Hannuksela | 358/504 |
| 2003/0112867 | A1* | 6/2003 | Hannuksela et al. | 375/240.08 |
| 2003/0118107 | A1* | 6/2003 | Itakura et al. | 375/240.19 |
| 2003/0126238 | A1* | 7/2003 | Kohno et al. | 709/220 |
| 2003/0135863 | A1* | 7/2003 | Van Der Schaar | 725/95 |
| 2003/0206558 | A1* | 11/2003 | Parkkinen et al. | 370/477 |
| 2005/0244070 | A1* | 11/2005 | Itakura | 382/248 |
| 2006/0023748 | A1* | 2/2006 | Chandhok et al. | 370/469 |
| 2006/0039469 | A1* | 2/2006 | Leibbrandt | 375/240.08 |
| 2006/0039480 | A1* | 2/2006 | Seo | 375/240.24 |
| 2007/0206592 | A1* | 9/2007 | Itakura et al. | 370/389 |

FOREIGN PATENT DOCUMENTS

| | | |
|---|---|---|
| JP | 5-64006 | 3/1993 |
| JP | 5-216800 | 8/1993 |
| JP | 11-155144 | 6/1999 |
| JP | 11-266457 | 9/1999 |
| JP | 2000-78573 | 3/2000 |
| JP | 2000-209258 | 7/2000 |
| JP | 2000-341668 | 12/2000 |
| JP | 2001-45098 | 2/2001 |
| JP | 2001-111433 | 4/2001 |
| JP | 2001-111983 | 4/2001 |
| JP | 2001-223888 | 8/2001 |
| JP | 2001-352533 | 12/2001 |
| WO | WO 02/01881 | 1/2002 |

OTHER PUBLICATIONS

Ruibiao Qiu, Wei Yu, "An efficient quality scalable motion-JPEG2000 transmission scheme", 2001, <URL: http://www.arl.wustl.edu/arl/Publications/2000-04/wucs0137.pdf >.*

McCanne, S., Vetterli, M., "Low-Complexity Video Coding for Receiver-Driven Layered Multicast", IEEE Journal on Selected Areas in Communications, vol. 15, No. 6, Aug. 1997, pp. 983-1001.*

Toshiaki Endoh et al., "Progressive Coding Scheme of Multi-Level Images", Kokusai Denshin Denwa Co. Ltd. (KDD) R&D Laboratories, Jul. 26, 1985, vol. 85, No. 104, pp. 65 to 72.

Bottreau, V. et al., "A Fully Scalable 3D Subband Video Codec," IEEE International Conference on Image Processing, vol. 2, Oct. 7, 2001, pp. 1017-1020.

Hannuksela, M., "Enhanced Concept of GOP," Joint Video Team (JVT) of ISO/IEC MPEG & ITU-TVCEG, $2^{nd}$ Meeting, Geneva, CH, Jan. 29-Feb. 1, 2002, pp. 1-14.

Qiu, R. et al., "An Efficient Quality Scalable Motion-JPEG200 Transmission Scheme," Applied Research Laboratory, Department of Computer Science, Washington University, Nov. 6, 2001, pp. 1-9.

Rejaie, R. et al., "Layered Quality Adaptation for Internet Video Streaming," IEEE Journal on Selected Areas in Communications, vol. 18, No. 12, Dec. 2000, pp. 2530-2543.

van der Schaar, M. et al., "Adaptive Motion-Compensation Fine-Granular-Scalability (AMC-FGS) for Wireless Video," IEEE Transactions on Circuits and Systems for Video Technology, vol. 12, No. 6, Jun. 2002, pp. 360-371.

Part 3 Editors Ed., "Motion JPEG 2000 Final Draft International Standard 1.0," Joint Photographic Expert Group (JPEG), Crowborough: JPEG Forum Ltd., Oct. 2001, pp. 1-41.

Supplementary European Patent Office Search Report mailed Dec. 12, 2008 in corresponding application EP0370565.

* cited by examiner

F I G. 7
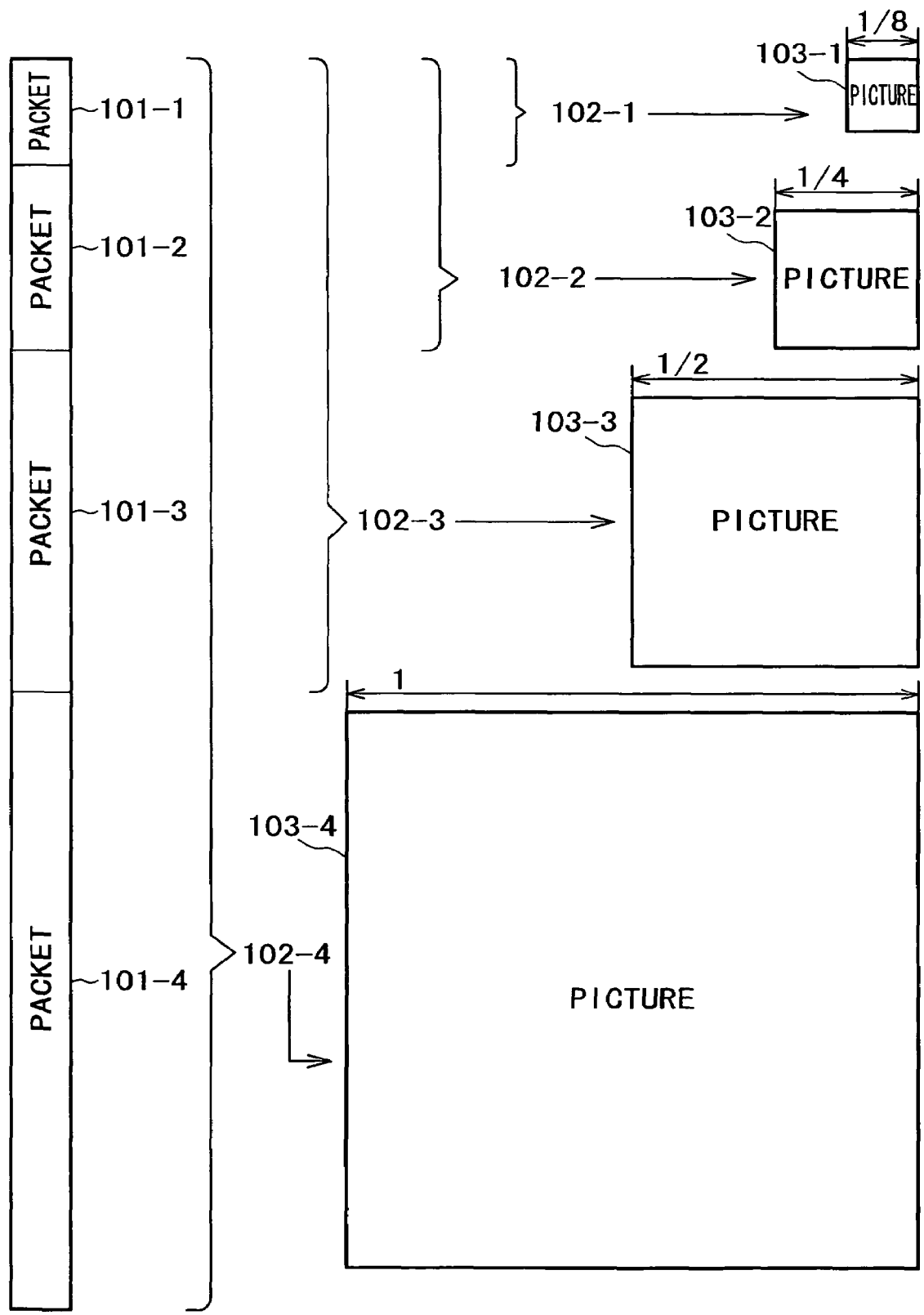

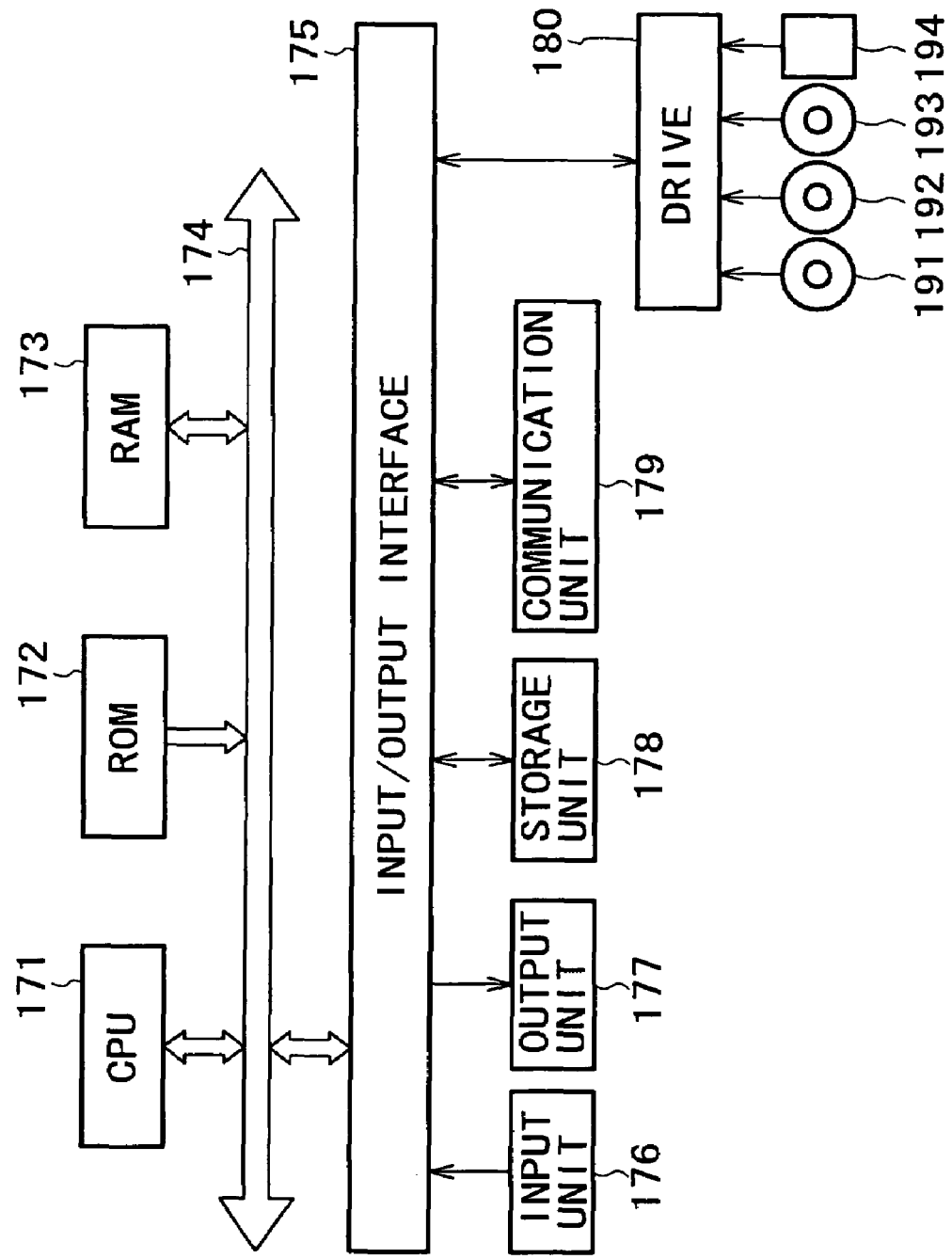

MOVING PICTURE DISTRIBUTION SYSTEM, MOVING PICTURE DISTRIBUTION DEVICE AND METHOD, RECORDING MEDIUM, AND PROGRAM

CROSS REFERENCE

This application claims priority to International Application No. PCT/JP03/01417, filed Feb. 12, 2003, and to Japanese Patent Application No. 2002-0141395, filed Feb. 19, 2002.

TECHNICAL FIELD

The present invention relates to a moving-picture distribution system, a moving-picture distribution apparatus and method, a recording medium and a program thereof. More particularly, the present invention relates to a moving-picture distribution system, a moving-picture distribution apparatus and method, a recording medium and a program for distributing a moving picture having qualities different from each other at the same time to a plurality of users specifying the different qualities.

BACKGROUND ART

In some fields, there is a demand for a moving-picture distribution system in which a server is capable of distributing the same source such as a moving picture at the same time to a plurality of terminals having capabilities different from each other. The fields include the field of streaming distribution of information such as a video on demand or a live picture and the field of real-time communication applied to a video conference, a television telephone or the like. Examples of the terminals are a cellular phone having a display device with a low resolution as well as a CPU (Central Processing Unit) with a small processing capability and a personal computer having a display device with a high resolution as well as a CPU with a large processing capability.

As such a moving-picture distribution system, a moving-picture distribution system, which makes use of a layered encoding technology of carrying out a layered encoding process on data of moving picture typically in frame units, currently becomes a subject of research and development. Compression/decompression systems capable of utilizing this layered encoding technology include the already known MPEG (Moving Picture Experts Group)-4 system and Motion JPEG (Joint Photographic Experts Group)-2000 system for handling not only still pictures but also moving pictures.

In the MPEG4 system, a layered encoding technology known as a Fine Granularity Scalability technology is included in its standard and planned to be profiled. This layered encoding technology is said to be a technology that is capable of distributing a moving picture in a scalable manner at different bit rates ranging from a higher one to a lower one.

On the other hand, the Motion JPEG2000 system adopts a wavelet transform technology. In this system, frame data is processed by adopting a packet generation technology and the layered encoding technology utilizing characteristics of the wavelet transform technology. To put it in detail, techniques are adopted for encoding the data to provide predetermined qualities and arranging pieces of encoded data in a predetermined order before putting the data in layered packets. The qualities include a spatial resolution and an SNR (Signal to Noise Ratio) picture quality, which is referred to hereafter simply as a picture quality.

In addition, in accordance with Part 3 of the Motion JPEG2000, layered data is kept in a file format.

Thus, in the conventional moving-picture distribution system, the server needs to prepare a sender data as a plurality of pieces of moving-picture data for distribution with different formats for terminals with different capabilities or a plurality of different pieces of data for different transmission rates. In a moving-picture distribution system adopting a layered encoding technology like the one described above, however, the server is capable of distributing data at the same time to terminals with different capabilities by merely preparing a piece of file data put in a layered structure.

When adopting the Motion JPEG2000 method in the moving-picture distribution system, however, the Motion JPEG2000 is used as a base and one server distributes data of a moving picture to a plurality of terminals. In this case, the moving-picture distribution system raises a problem that the aforementioned piece of file data put in a layered structure must be processed in ways different from each other in dependence on qualities specified by the terminals.

Assume for example that a first terminal requests a server to transmit data of a moving picture, specifying a spatial resolution progressive. On the other hand, a second terminal requests the server to transmit the data of the moving picture, specifying a picture-quality progressive.

In this case, the server typically carries out a layered encoding process on the data of the moving picture in frame units and packetizes the encoded data to generate one piece of file data. A piece of file data includes a plurality of packets. Thus, the moving-picture distribution system raises a problem that, as post-processing, the server needs to concurrently carry out the following different processes for the different progressives.

To be more specific, the server must carry out complicated processing as follows. First of all, the server examines the packets composing the file data to discriminate packets for a specific one of the progressives against packets for the other progressive. Then, the packets for the specific progressive are rearranged in the order of this specific progressive and the packets for the other progressive are rearranged in the order of the other progressive to generate a group of packets for each of the progressives specified by the terminals. Finally, the server selects a group of packets for each of the terminals and transmits each selected group of packets to the appropriate terminal. As a result, the moving-picture distribution system raises a problem that it is difficult to carry out this processing in a real-time manner.

It is to be noted that, data is encoded in accordance with a predetermined encoding method and pieces of encoded data arranged in a predetermined order are decoded and displayed in a display in which, initially, a picture having a low quality is displayed and, with the lapse of time, the displayed picture is improved for higher quality. In this specification, such a display is-referred-to as a progressive display, an encoding method for producing a progressive display is known as a progressive encoding method, and an order in which codes are arranged to implement a progressive display is called a progressive order.

That is to say, the encoding method based on the Motion JPEG2000 system, that is, the encoding method utilizing the wavelet transform, is an implementation of the progressive encoding method. In other words, a Motion-JPEG2000 encoder encodes data of a moving picture in frame units in such a way that a picture obtained as a result of a decoding process carried out by a decoder serving as a counterpart of the encoder is displayed in a progressive display.

In addition, the quality of a picture appearing in a progressive display is referred to hereafter as a progressive. To put it concretely, the progressive (quality) can be expressed in terms of a spatial resolution, a picture quality and color components to mention a few.

Incidentally, Sony Corporation serving as an applicant for this patent has developed a moving-picture distribution system adopting the Motion JPEG method described above to assign pictures of different qualities in frame units to a plurality of terminals and distribute the frames to the terminals as disclosed in Japanese Patent Laid-open No. 2000-341668.

To put it concretely, an encoder employed in a server of the moving-picture distribution system is capable of encoding frames on the basis of a frame interval set in advance and a quality varying from frame to frame. Thus, the server is capable of distributing a moving picture having a quality corresponding to one of a plurality of terminals receiving the moving picture. The quality varies from frame to frame in dependence on the display capability of the receiver terminal, a frame rate specified by the terminal or a usable band of the network connecting the server to the terminal.

In this moving-picture distribution system, however, only one type of quality is assigned to every frame. Thus, given a server capable of encoding moving-picture data at a rate of 30 frames per second, for example, the server apportions 15 frames of the 30 frames to a terminal specifying a moving picture with a resolution of 15 frames per second and 5 frames of the remaining 15 frames to another terminal specifying a moving picture with a resolution of 5 frames per second.

That is to say, the number of terminals that can receive a distributed moving picture is determined by how the server apportions these 30 frames to the terminals. Thus, this moving-picture distribution system has a problem that the number of terminals that can receive a distributed moving picture with different qualities is limited.

In addition, this moving-picture distribution system raises another problem that, by apportioning 15 frames to the terminal specifying a moving picture with a low resolution of 15 frames per second, the moving-picture distribution system cannot apportion the remaining 15 frames to a terminal specifying a moving picture with a high resolution of 30 frames per second due to the fact that its encoding capability is only 30 frames per second. This is because a frame of an assigned quality can be used only at the assigned quality.

DISCLOSURE OF INVENTION

Addressing such a situation, the present invention makes it possible to distribute a picture with different qualities at the same time to a plurality of users each specifying the picture with one of the qualities.

A moving-picture distribution system provided by the present invention is characterized in that the moving-picture distribution system includes:

a moving-picture distribution apparatus including:
encoding means for carrying out a layered encoding process on a moving picture in access units on the basis of a predetermined quality;
packet generation means for packetizing each of the access units obtained as a result of the layered encoding process carried out by the encoding means and generating a packet group including a plurality of said packets each corresponding to a layer; and
first communication means for transmitting one of the packets included in the packet group generated by the packet generation means as a packet corresponding to a predetermined layer; and a receiver terminal including:
second communication means for receiving the packet from the first communication means of the moving-picture distribution apparatus; and
decoding means for decoding the packet received by the second communication means;
wherein the receiver terminal specifies the predetermined quality and the predetermined layer, informing the moving-picture distribution apparatus of the specified quality and the specified layer.

The encoding means may adopt a progressive encoding method.

As a progressive encoding method of the encoding means, an encoding method based on wavelet transform can be adopted.

As an encoding method based on wavelet transform, an encoding method conforming to a Motion JPEG2000 system can be adopted.

The receiver terminal may specify at least one of a spatial-resolution quality, a picture quality and a color-component quality as a predetermined quality.

The receiver terminal may also specify the number of access units that can be decoded by the decoding means per predetermined unit time as a predetermined quality.

There may be more than one receiver terminals. The first receiver terminal may specify a first quality and a first layer. The second receiver terminal may specify a second quality and a second layer. The encoding may carry out a layered encoding process on the same access unit on the basis of the first quality as well as on the basis of the second quality. The packet generation means may put each of the access units obtained as a result of a layered encoding process carried out by the encoding means on the basis of the first quality in first packets, generating a first packet group including a plurality of said first packets and may put each of the access units obtained as a result of a layered encoding process carried out by the encoding means on the basis of the second quality in second packets, generating a second packet group including a plurality of said second packets. The first communication means may transmit a first packet included in the first packet group as a packet corresponding to the first layer to the first receiver terminal and may transmit a second packet included in the second packet group as a packet corresponding to the second layer to the second receiver terminal.

The moving-picture distribution apparatus may further include first storage means for storing each access unit obtained as a result of the layered encoding process carried out by the encoding means on the basis of the first quality and second storage means for storing each access unit obtained as a result of the layered encoding process carried out by the encoding means on the basis of the second quality. The packet generation means is capable of putting each encoded access unit stored in the first storage means in first packets to generate the first packet group and putting each encoded access unit stored in the second storage means in second packets to generate the second packet group.

Each of the receiver terminals may further include information generation means for generating predetermined information including a specified quality and a specified layer as information of which the moving-picture distribution apparatus is notified. The second communication means transmits the predetermined information generated by the information generation means to the moving-picture distribution apparatus. The first communication means receives the predetermined information transmitted by the second communication means. The encoding means carries out a layered encoding process on a moving picture in access units on the basis of the quality included in the predetermined information received by the first communication means. The first communication means transmits a packet for the layer included in the predetermined information received by the first communication means to the receiver terminal.

Every packet included in a packet group generated by the packet generation means can be formed as an RTP packet.

The moving-picture distribution apparatus and the receiver terminal are connected to each other by a network. The moving-picture distribution apparatus may further include network-monitoring means for monitoring the state of the network. The encoding means may carry out a layered encoding process on a moving picture in access units on the basis of a network state monitored by the network-monitoring means.

The first and second communication means may use an IPv4 or IPv6 layer as a network layer.

In the moving-picture distribution system provided by the present invention, when any specific one of the receiver terminals specifies a predetermined quality as well as a predetermined layer and informs the moving-picture distribution apparatus of the specified predetermined quality as well as the specified predetermined layer, the encoding means employed in the moving-picture distribution apparatus carries out a layered encoding process on a moving picture in access units on the basis of the specified predetermined quality as well as the specified predetermined layer and packetizes each of the access units completing a layered encoding process to generate a packet group including a plurality of packets each corresponding to a layer. A packet corresponding to the specified predetermined layer is transmitted from the moving-picture distribution apparatus to the specific receiver terminal specifying the predetermined layer. The specific receiver terminal receives the packet from the moving-picture distribution apparatus and decodes the received packet.

A moving-picture distribution apparatus provided by the present invention is characterized in that the moving-picture distribution apparatus includes:
  encoding means for carrying out a layered encoding process on a moving picture in access units on the basis of a quality specified by a receiver terminal;
  packet generation means for packetizing each of the access units obtained as a result of the layered encoding process carried out by the encoding means and generating a packet group including a plurality of said packets each corresponding to a layer; and
  communication means for transmitting one of the packets included in the packet group generated by the packet generation means as a packet corresponding to a layer specified by a receiver terminal to the receiver terminal.

A moving-picture distribution method provided by the present invention is characterized in that the moving-picture distribution method includes:
  an encoding step of carrying out a layered encoding process on a moving picture in access units on the basis of a quality specified by a receiver terminal;
  a packet generation step of packetizing each of the access units obtained as a result of the layered encoding process carried out at the encoding step and generating a packet group including a plurality of said packets each corresponding to a layer; and
  a communication step of transmitting one of the packets included in the packet group generated in processing carried out at the packet generation step as a packet corresponding to a layer specified by a receiver terminal to the receiver terminal.

A recording medium provided by the present invention is characterized in that the recording medium is used for storing a program including:
  an encoding step of carrying out a layered encoding process on a moving picture in access units on the basis of a quality specified by a receiver terminal;
  a packet generation step of packetizing each of the access units obtained as a result of the layered encoding process carried out at the encoding step and generating a packet group including a plurality of said packets each corresponding to a layer; and
  a communication step of transmitting one of the packets included in the packet group generated in processing carried out at the packet generation step as a packet corresponding to a layer specified by a receiver terminal to the receiver terminal.

A program for a computer provided by the present invention is characterized in that the program executes:
  an encoding step of carrying out a layered encoding process on a moving picture in access units on the basis of a quality specified by a receiver terminal;
  a packet generation step of packetizing each of the access units obtained as a result of the layered encoding process carried out at the encoding step and generating a packet group including a plurality of said packets each corresponding to a layer; and
  a communication step of transmitting one of the packets included in the packet group generated in processing carried out at the packet generation step as a packet corresponding to a layer specified by a receiver terminal to the receiver terminal.

In the moving-picture distribution apparatus and method, recording medium and program provided by the present invention as described above, a moving picture is subjected to a layered encoding process in access units on the basis of a quality specified by a receiver terminal, access units completing the layered encoding process are each packetized to generate a packet group including a plurality of said packets each corresponding to a layer and one of the packets included in the group packet as a packet corresponding to a layer specified by the receiver terminal is transmitted to the receiver terminal.

BRIEF DESCRIPTION OF DRAWINGS

FIG. 7 is a diagram showing a typical configuration of layers for a case in which a packet generation process is carried out by the moving-picture distribution apparatus shown in FIG. 3 on the basis of a spatial resolution;

FIG. 16 is a diagram showing another typical configuration of the moving-picture distribution apparatus provided by the present invention.

BEST MODE FOR CARRYING OUT THE INVENTION

Figure 1:
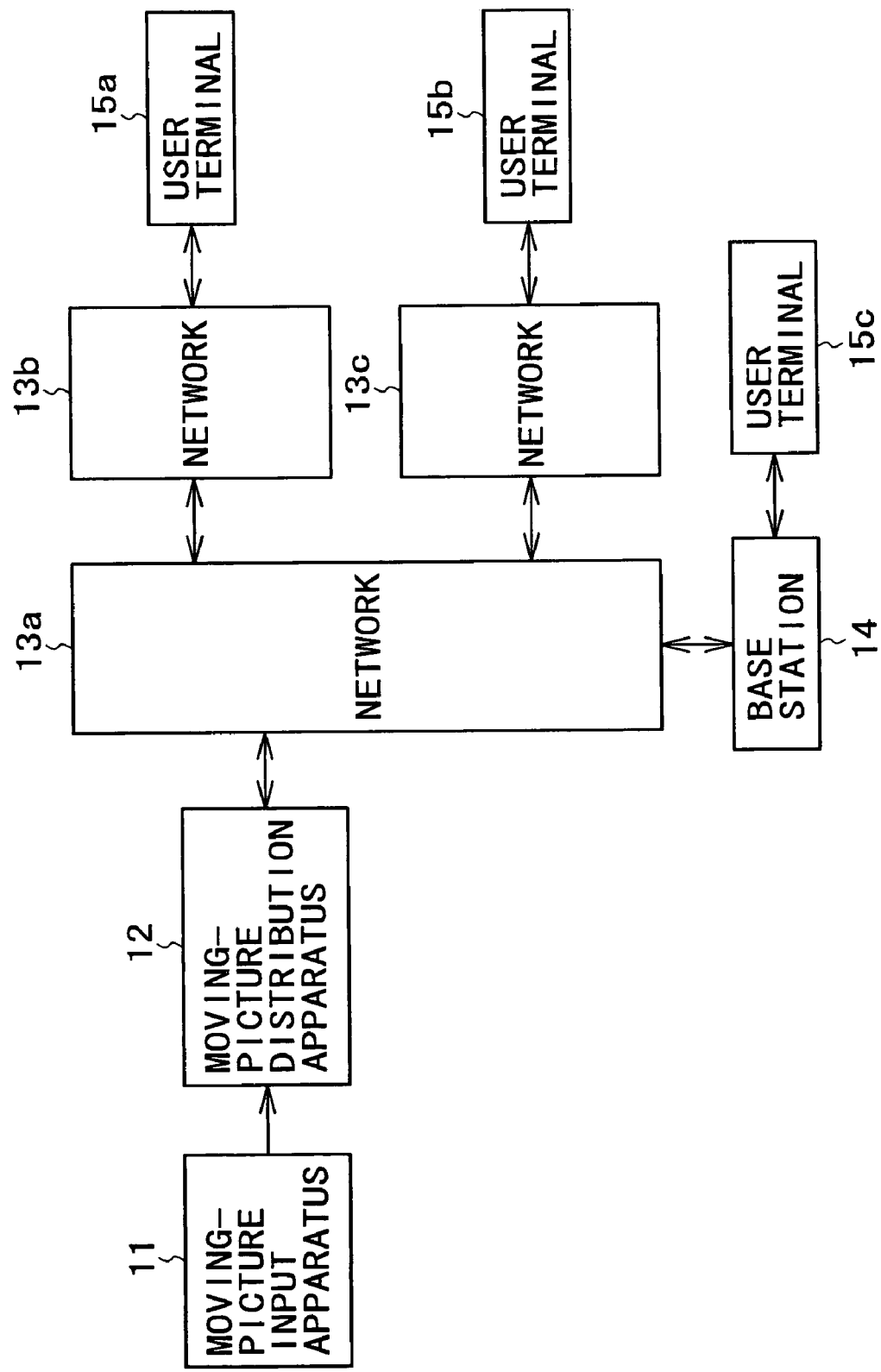
FIG. 1 is a diagram showing a typical configuration of a moving-picture distribution system provided by the present invention.

FIG. 1 is a diagram showing a typical configuration of a moving-picture distribution system provided by the present invention.

It is to be noted that, for example, while a frame can be used as a processing unit in the moving-picture distribution system shown in FIG. 1 as described above, a field can also be used as the processing unit. In the description of the present invention, the processing unit is also referred to as an access unit.

A moving-picture input apparatus 11 implemented typically by a video camera inputs video and audio signals, converts the signals into moving-picture data and supplies the moving-picture data to a moving-picture distribution apparatus 12.

It is to be noted that, in this embodiment, moving-picture data includes not only video data, but also audio data as described above.

The moving-picture distribution apparatus 12 carries out a layered encoding process on the moving-picture data supplied thereto in frame units by adoption of an encoding method based on wavelet transform. An example of the encoding method based on wavelet transform is the Motion JPEG2000 encoding method. Subsequently, the moving-picture distribution apparatus 12 packetizes each of encoded frames and generates a packet group including a plurality of said packets each corresponding to a layer.

Then, the moving-picture distribution apparatus 12 supplies one of the packets included in the generated packet group as a packet corresponding to a layer specified by a distribution target to a network 13a. The distribution target is any one of user terminals 15a to 15c to be described later.

It is to be noted that, in this embodiment, the Internet typically serves as the network 13a. In this case, the moving-picture distribution apparatus 12 supplies the packet to the network 13a as an IP (Internet protocol) packet.

The network 13a then passes on the IP packet to the distribution target indicated by an address included in the IP packet.

That is to say, with the user terminal 15a serving as the distribution target, the IP packet supplied to the network 13a is passed on to the user terminal 15a by way of a network 13b of a service provider, which renders dialup services. With the user terminal 15b serving as the distribution target, the IP packet supplied to the network 13a is passed on to the user terminal 15b by way of a network 13c of a service provider, which uses typically an ADSL (Asymmetrical Digital Subscriber Line). With the user terminal 15c serving as the distribution target, the IP packet supplied to the network 13a is passed on by way of a base station 14 through a radio-communication network to the user terminal 15c, which is a mobile terminal such as a cellular phone.

The user terminals 15a to 15c each include a CPU having a processing speed allowing a connection to the network 13a, a decoder capable of decoding encoded data in a speed range of the processing speed and a display unit for displaying data obtained as a result of decoding at a predetermined resolution.

In addition, in accordance with the resolution of the display unit mentioned above and the processing capability of the CPU cited above, the user terminals 15a to 15c each generate the so-called QOS (Quality of Service) information, that is, information on setup requirements and the like to be described later. The QOS information of a terminal is quality information representing, among other attributes of the terminal, the capability and bit rate of the terminal. Then, the user terminals 15a to 15c each transmit the QOS information to the moving-picture distribution apparatus 12 by way of relay means and the network 13a. The relay means is the network 13b in the case of the user terminal 15a, the network 13c in the case of the user terminal 15b or the radio-communication network and the base station 14 in the case of the user terminal 15c.

The moving-picture distribution apparatus 12 determines a packet to be transmitted to each of the user terminals 15a to 15c as a packet corresponding to a progressive order of the terminal or corresponding to a layer of the terminal. The packet is selected from the packet group cited above in accordance with the usable band of the network 13a and the QOS information provided by each of the user terminals 15a to 15c.

Figure 2:
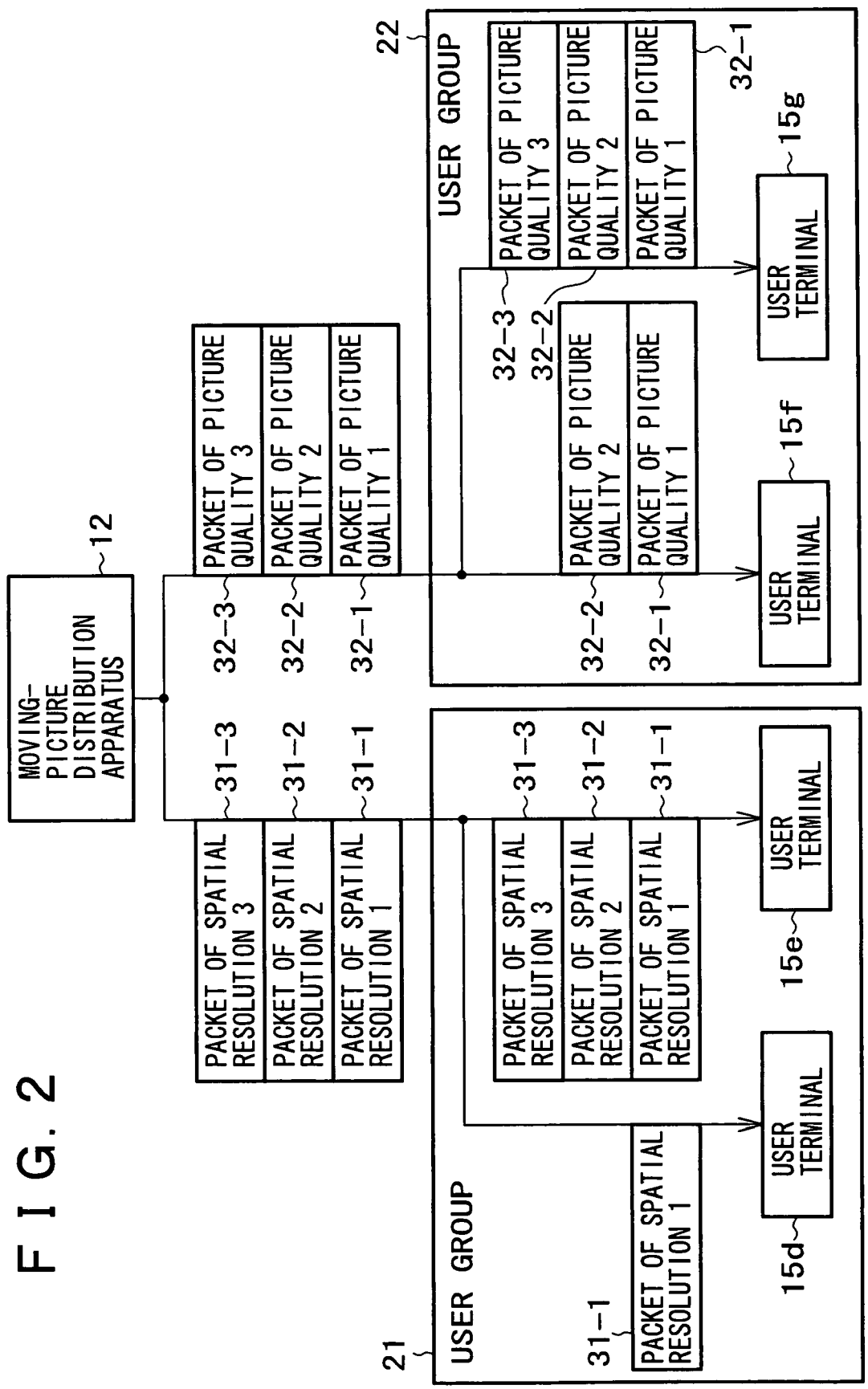
FIG. 2 is a diagram showing typical distribution of a moving picture in the moving-picture distribution system shown in FIG. 1.

By referring to FIG. 2, the following description explains an outline of operations carried out by the moving-picture distribution system shown in FIG. 1.

FIG. 2 is a diagram showing typical distribution of moving-picture data according to two types of quality.

It is to be noted that, in order to make the explanation simple, FIG. 2 showing the typical distribution shown does not show the relay means such as the network 13a, which should exist between the moving-picture distribution apparatus 12 and the terminals 15d to 15g.

As an example, terminals are now divided into user groups 21 and 22 for different methods of requesting a quality.

The user group 21 includes the user terminals 15d and 15e, which have spatial resolutions different from each other. Thus, the user terminals 15d and 15e each need to specify a progressive of a spatial resolution and inform the moving-picture distribution apparatus 12 of the specified spatial resolution progressive.

On the other hand, the user group 22 includes the user terminals 15f and 15g, which are connected to the moving-picture distribution apparatus 12 by networks having bands different from each other. Thus, the user terminals 15f and 15g each need to specify a progressive of a picture quality and inform the moving-picture distribution apparatus 12 of the specified picture-quality progressive. A progressive of a picture quality needs to be specified because the specified picture-quality progressive indicates that a bit rate varies from terminal to terminal in spite of the fact that the terminals have the same spatial resolution.

The moving-picture distribution apparatus 12 is capable of preparing frames with different progressive orders each corresponding to a specified progressive or corresponding to a specified spatial resolution and a specified picture quality and capable of distributing a moving picture in a scalable manner to terminals pertaining to different groups. In the case of the typical distribution shown in FIG. 2, the groups are the user group 21 and 22 whereas the terminals are the user terminals, 15d, 15e, 15f and 15g.

To put it concretely, the moving-picture distribution apparatus 12 prepares encoded packets 31-1 to 31-3 arranged in the spatial-resolution progressive order in the user group 21. The moving-picture distribution apparatus 12 then transmits the packet 31-1 of the spatial resolution for the user terminal 15d to the user terminal 15d and the packets 31-1 to 31-3 of the spatial resolution for the user terminal 15e to the user terminal 15e.

It is to be noted that the packets 31-1 to 31-3 are grouped in an order of increasing spatial resolutions, which are identified by resolutions 1, 2 and 3 respectively.

The identification method is not limited to the one described above. In this embodiment, for example, the identifiers for resolutions 1, 2 and 3 can be inserted into the headers of the packets 31-1 to 31-3 respectively, and the spatial resolutions can be identified by referring to the headers.

For example, the user terminal 15d has a small display unit. In this case, the user terminal 15d generates information including a specification of resolution 1 as the QOS information described above and transmits the information to the moving-picture distribution apparatus 12. In accordance with the information received from the user terminal 15d, the moving-picture distribution apparatus 12 selects the packet 31-1 of resolution 1 among the packets 31-1 to 31-3 obtained as a result of an encoding process carried out in a spatial-resolution progressive order and transmits the packet 31-1 to the user terminal 15d. Thus, the user terminal 15d is capable of displaying a moving picture having a spatial-resolution level of resolution 1 or having a spatial resolution for the small screen of its display unit.

On the other hand, the user terminal 15e has a large display unit for example. In this case, the user terminal 15e generates information including a specification of resolution 3 as the QOS information described above and transmits the information to the moving-picture distribution apparatus 12. In accordance with the information received from the user terminal 15e, the moving-picture distribution apparatus 12 transmits the packet 31-1 of resolution 1 to the packet 31-3 of resolution 3, which have been obtained as a result of an encoding process carried out in a spatial-resolution progressive order, to the user terminal 15e. Thus, the user terminal 15e is capable of displaying a moving picture having a spatial-resolution level of resolution 3 or having a spatial resolution for the large screen of its display unit.

As described above, the moving-picture distribution apparatus 12 is capable of transmitting a moving picture scalable to the spatial resolution of the user terminal 15d or 15e included in the user group 21 to the user terminal 15d or 15e respectively. Thus, the moving-picture distribution system including the moving-picture distribution apparatus 12 as shown in FIG. 1 can be used for example in the following applications.

The moving-picture distribution system shown in FIG. 1 is appropriate for a case in which a terminal having a small screen like the user terminal 15d is required for example as a display terminal of a monitoring camera or a display terminal for detecting a movement and a moving-picture display assuring a continuous frame rate is required instead of a moving picture with a picture quality deteriorating due to a congestion in the network or a moving picture with frames skipped.

In addition, the moving-picture distribution system shown in FIG. 1 is also appropriate for a case in which moving-picture data required to have a high bit rate like typically an HDTV (High-Definition television) system is distributed to users by way of a communication path having a big and varying traffic like the Internet and the resolution of the moving-picture data has to be lowered to approximately a level of an NTSC (National Television System Committee) level in order to convert the moving-picture data into moving-picture data introducing no visual incompatibility.

Incidentally, the user terminals 15f and 15g pertaining to the user group 22 have display units of the same size as described above but have different network environments by which the user terminal 15f and 15g are connected to the user group 22. That is to say, the bandwidth of the user terminal 15f is different from the bandwidth of the user terminal 15g and the picture quality is determined by the bandwidth.

For this reason, the moving-picture distribution apparatus 12 prepares encoded packets 32-1 to 32-3 arranged in the picture-quality progressive order in the user group 22. The moving-picture distribution apparatus 12 then transmits the packets 32-1 and 32-2 of the picture quality for the user terminal 15f to the user terminal 15f and the packets 32-1 to 32-3 of the picture quality for the user terminal 15g to the user terminal 15g.

It is to be noted that the packets 32-1 to 32-3 are grouped in an order of increasing picture qualities, which are identified by picture qualities 1, 2 and 3 respectively.

The identification method is not limited to the one described above. In this embodiment, for example, much like the packets 31-1 to 31-3, the identifiers for picture qualities 1, 2 and 3 can be inserted into the headers of the packets 32-1 to 32-3 respectively, and the picture qualities can be identified by referring to the headers.

To put it concretely, the user terminal 15f generates information including a specification of picture quality 2 as the QOS information described above and transmits the information to the moving-picture distribution apparatus 12. In accordance with the information received from the user terminal 15f, the moving-picture distribution apparatus 12 selects the packet 32-1 of picture quality 1 as well as the packet 32-2 of picture quality 2 among the packets 32-1 to 32-3 obtained as a result of an encoding process carried out in a picture-quality progressive order, and transmits the packets 32-1 as well as 32-2 to the user terminal 15f. Thus, the user terminal 15f is capable of displaying a moving picture having a picture-quality level of picture quality 2.

On the other hand, the user terminal 15g. generates information including a specification of picture quality 3 as the QOS information described above and transmits the information to the moving-picture distribution apparatus 12. In accordance with the information received from the user terminal 15g, the moving-picture distribution apparatus 12 transmits the packet 32-1 of picture quality 1 to the packet 32-3 of picture quality 3, which have been obtained as a result of an encoding process carried out in a picture-quality progressive order, to the user terminal 15g. Thus, the user terminal 15g is capable of displaying a moving picture having a picture-quality level of picture quality 3.

As described above, the moving-picture distribution apparatus 12 is capable of transmitting (or distributing) a moving picture scalable to the picture quality of the user terminal 15f or 15g included in the user group 22 to the user terminal 15f or 15g respectively. Thus, the user terminals 15f and 15g are capable of receiving a moving picture having a picture quality according to the speeds of the transmission lines connected to the user terminals 5f and 15g.

Figure 3:
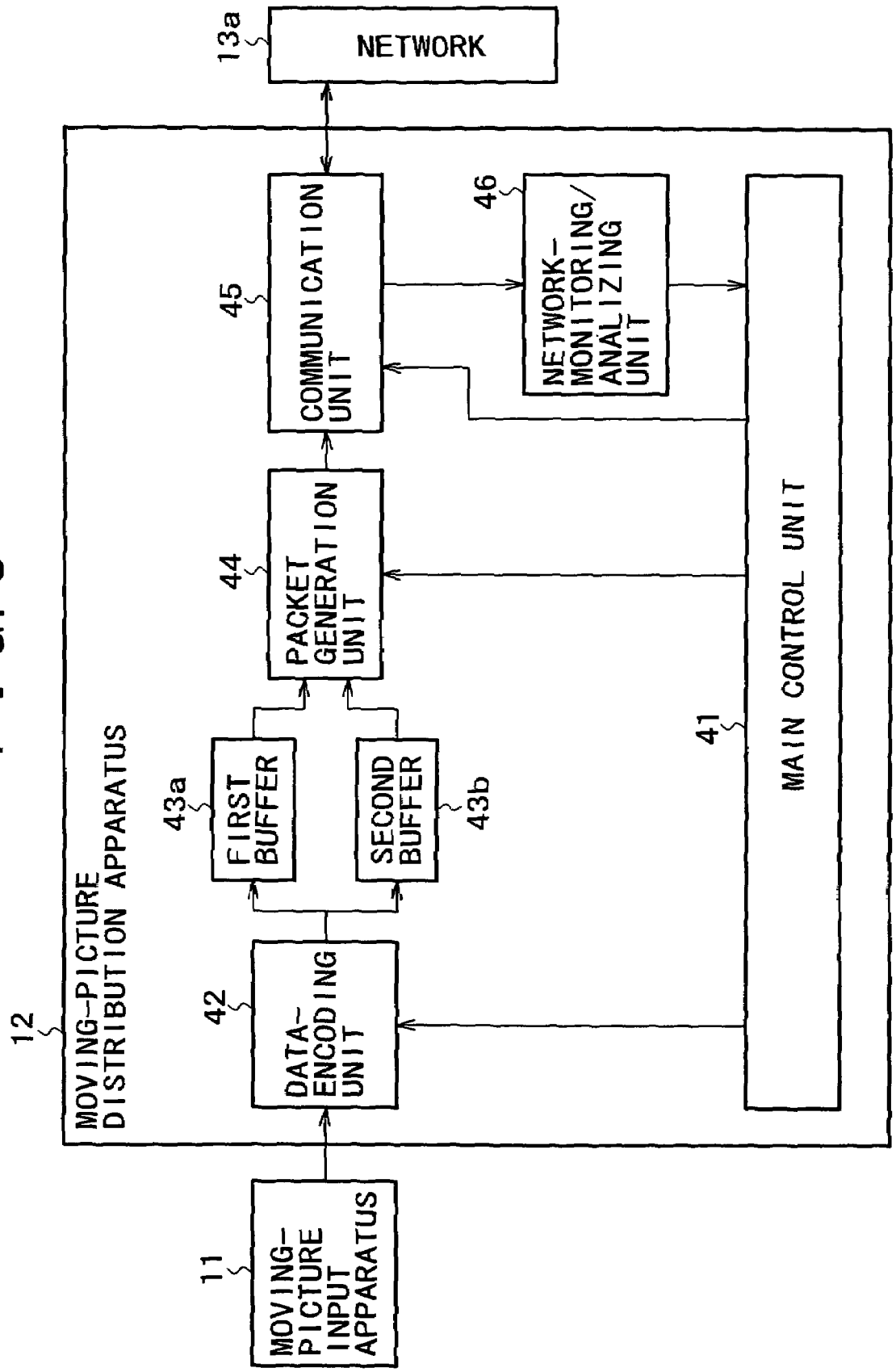
FIG. 3 is a diagram showing a typical configuration of a moving-picture distribution apparatus employed in the moving-picture distribution system shown in FIG. 1.

Next, the configuration of the moving-picture distribution apparatus 12 is explained by referring to FIG. 3.

A main control unit 41 controls the operation of the moving-picture distribution apparatus 12 as a whole. A data-encoding unit 42 carries out a layered encoding process on moving-picture data, which is received from a moving-picture input apparatus 11, in frame units on basis of control parameters received from the main control unit 41. The control parameters include a parameter indicating which progressive is used as a basis for carrying out the layered encoding process on any frame. The data-encoding unit 42 then supplies a result of the layered encoding process to either a first buffer 43a or a second buffer 43b, which is specified by a control parameter.

Assume for example that control parameters received from the main control unit 41 include information indicating that every frame is to be subjected to a layered encoding process on the basis of two kinds of progressive, namely, first and second progressives. In this case, the data-encoding unit 42 carries out a layered encoding process on every frame on the basis of the first progressive, storing a result of the encoding process in the first buffer 43a, and also carries out a layered encoding process on every frame on the basis of the second progressive, storing a result of the encoding process in the second buffer 43b.

That is to say, in this case, the first buffer 43a is a buffer dedicated for storing frames completing a layered encoding process on the basis of the first progressive while the second buffer 43b is a buffer dedicated for storing frames completing a layered encoding process on the basis of the second progressive.

In the typical configuration shown in FIG. 3, the first buffer 43a and the second buffer 43b are the only buffers. Thus, the numbers of buffers is two. In actuality, however, as many buffers as kinds of progressive, which are included in a control parameter supplied by the main control unit 42, are required.

In other words, the data-encoding unit 42 carries out a layered encoding process on the same frame (the same picture) by changing the progressive order and stores a result of the layered encoding process in a buffer dedicated for the progressive. The buffer dedicated for the progressive can be the first buffer 43a, the second buffer 43b or another buffer.

It is to be noted that the encoding method adopted by the data-encoding unit 42 can be any encoding method as long as the method can be used for carrying out a layered encoding process. In this embodiment, for example, the encoding method based on the Motion JPEG2000 system is adopted as described above. The encoding method based on the Motion JPEG2000 system, which is an encoding method making use of wavelet transform, is one of progressive encoding methods.

A packet generation unit 44 analyzes data stored in the first buffer 43a or the second buffer 43b on the basis of control executed by the main control unit 41 to detect a data delimiter for every progressive layer. As is obvious from the above description, the data stored in the first buffer 43a or the second buffer 43b is data of frames completing a layered encoding process by the data-encoding unit 42. Then, the packet generation unit 44 packetizes the data for each layer, generating a packet group including a plurality of packets each corresponding to a layer. This processing is carried out on data stored in the first buffer 43a and the second buffer 43b in frame units.

In addition, the packet generation unit 44 attaches a flag to every packet to represent an identifier corresponding to the layer for the packet.

This identifier attached to a packet is required for specifying a packet suitable for the capability of a terminal when the moving-picture distribution apparatus 12 distributes the packet to terminals by adoption of a broadcasting technique. In the typical configuration shown in FIG. 1, the terminals are the user terminals 15a to 15c. That is to say, when the moving-picture distribution apparatus 12 transmits a packet to a terminal in a one-to-one mode, on the other hand, the identifier attached to the packet is not mandatory.

As described above, in the typical configuration shown in FIG. 3, the packet generation unit 44 packetizes data of each of frames stored in the first buffer 43a and the second buffer 43b as results of a layered encoding process in the respective progressive orders to generate packet groups each including a plurality of packets each corresponding to a layer. Each of the packets has an identifier corresponding the layer for the packet. Then, the packet generation unit 44 supplies the packet groups to a communication unit 45.

On the basis of control executed by the main control unit 41, the communication unit 45 outputs packets included in a received packet group as packets specified by the main control unit 41 to the network 13a.

It is to be noted that, if necessary, the packet generation unit 44 is capable of further converting every packet into an IP packet. In this case, the packet generation unit 44 may include a flag indicating a priority level for an identifier attached to a packet in the header of the IP packet.

For example, in accordance with IPv4, which is version 4 of IP specifications, a priority level is indicated for a TOS (Type Of Service) to allow priority control to be executed for prioritized packets transmitted through a network corresponding to Diffserve. In accordance with IPv6, which is version 6 of the IP specifications, on the other hand, a priority level can be indicated for a flow label.

As described above, when the protocol varies in dependence on the network layer, the number of items for which a priority level is indicated also changes as well. It is thus desirable to specify a priority level and associate the specified priority level as a priority level of a packet with the packet, which is recognized by a layer for a layered encoding process carried out by the data-encoding unit 42 or recognized by an application, or as a priority level on a network layer with the network layer. Control of a process to specify a priority level is executed by the main control unit 41.

This control of a process to specify a priority level can be a control to set priority levels in a state of being associated in advance or control to dynamically change the setting of priority levels by considering the state of traffic through the network and considering loads borne by receiver terminals, which are the user terminals 15a to 15c in the typical configuration shown in FIG. 1.

As a typical method to monitor the state of traffic through the network, a method applying an RTCP (RTP (Real-time Transport Protocol) Control Protocol) is known. The RTCP is a protocol in an RFC (Request For Comments) 1889 of an IETF (Internet Engineering Task Force).

In accordance with this method, a sender side transmits a so-called sender report as a packet to a receiver side. The sender report is information including the number of transmitted RTP packets and a timestamp. On the basis of this sender report, the receiver side returns a so-called receiver report to the sender side. The receiver report is information including an RTP-packet loss rate, the number of lost packets, a received largest sequence number and arrival time jitters.

As described above, the RTCP is a protocol between the sender and receiver sides. The RTCP is a protocol functioning independently of the type of a network existing between the sender and receiver sides, that is, a protocol functioning without regard to whether the network is a LAN (Local Area Network), a WAN (Wide Area Network) or a network of another type.

Thus, in this embodiment, the main control unit 41 typically monitors information on the traffic through the network on the basis of this RTCP, and executes the aforementioned control of a process to specify a priority level.

That is to say, the communication unit 45 receives a receiver report transmitted by each of the receiver terminals by way of the network 13a, and supplies the report to a network-monitoring/analyzing unit 46. The receiver terminals are the user terminals 15a to 15c in the typical configuration shown in FIG. 1.

On the basis of the receiver reports received from the receiver terminals, the network-monitoring/analyzing unit 46 determines the state of congestion of the network and, on the basis of a determination result, the network-monitoring/analyzing unit 46 further supplies pieces of information for the respective receiver terminals to the main control unit 41. The pieces of information are each information necessary for lowering the encoding rate used by the data-encoding unit 42 and reducing the number of frames to be transmitted.

On the basis of information for a predetermined receiver terminal, the main control unit 41 generates control parameters and supplies the parameters to the data-encoding unit 42. The information for a predetermined receiver terminal is selected from the pieces of information for the receiver terminals.

In addition, on the basis of the received pieces of information for the receiver terminals, the main control unit 41 executes the aforementioned setting control for the respective progressives. To be more specific, for each of the progressives, the main control unit 41 sets an IP priority level corresponding to the identifier described above and supplies the IP priority level to the packet generation unit 44. The packet generation unit 44 then newly sets a flag representing the IP priority level received from the main control unit 41 in the header of an IP packet for the progressive corresponding to the IP priority level.

As described above, the main control unit 41 controls the packet generation unit 44, setting a priority level, so that a service provider using the moving-picture distribution apparatus 12 is capable of executing control to assure a minimum quality that the provider wants to guarantee.

Figure 4:
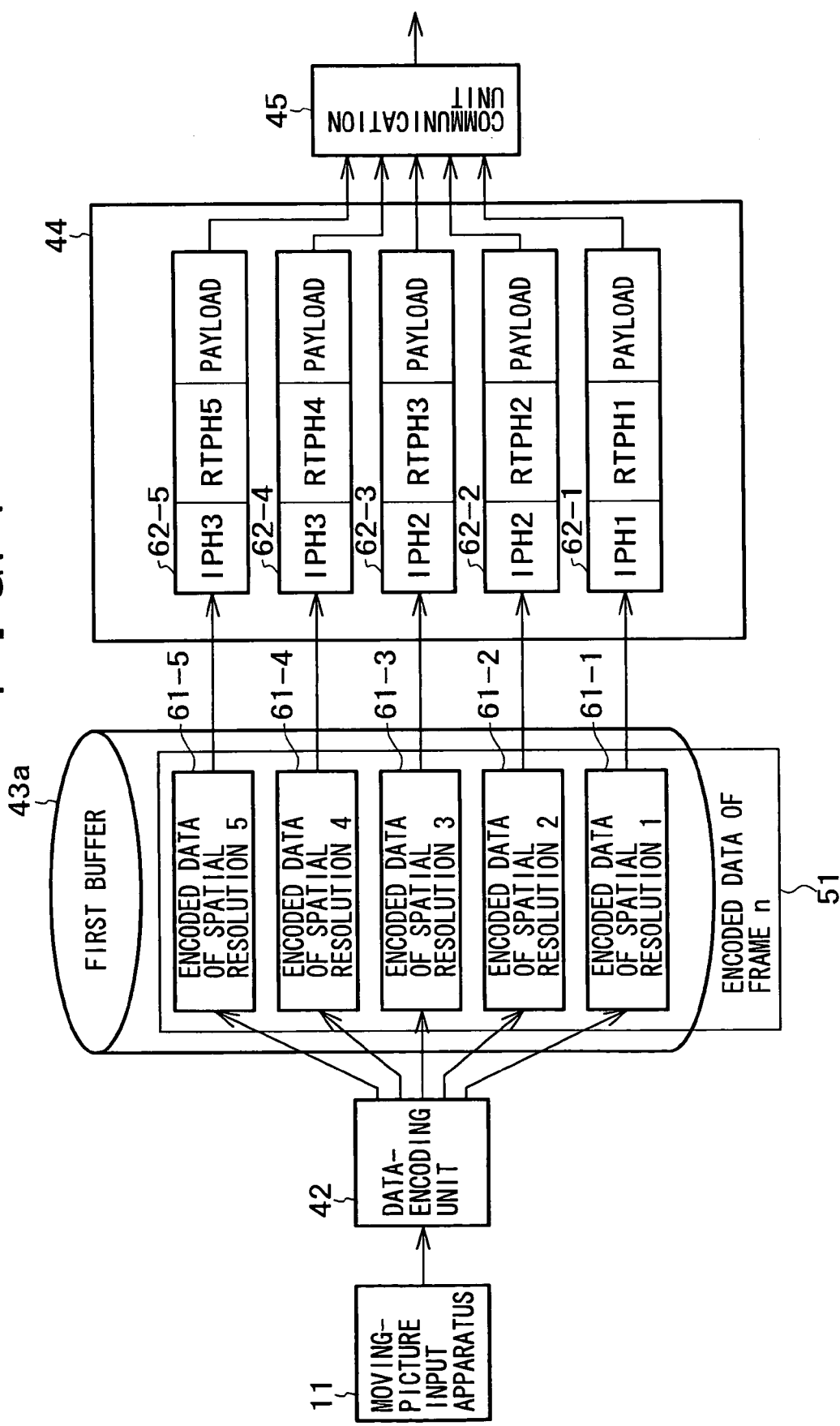
FIG. 4 is a diagram showing a typical structure of each packet obtained as a result of a packet generation process carried out by the moving-picture distribution apparatus shown in FIG. 3 on the basis of a spatial resolution.
Figure 5:
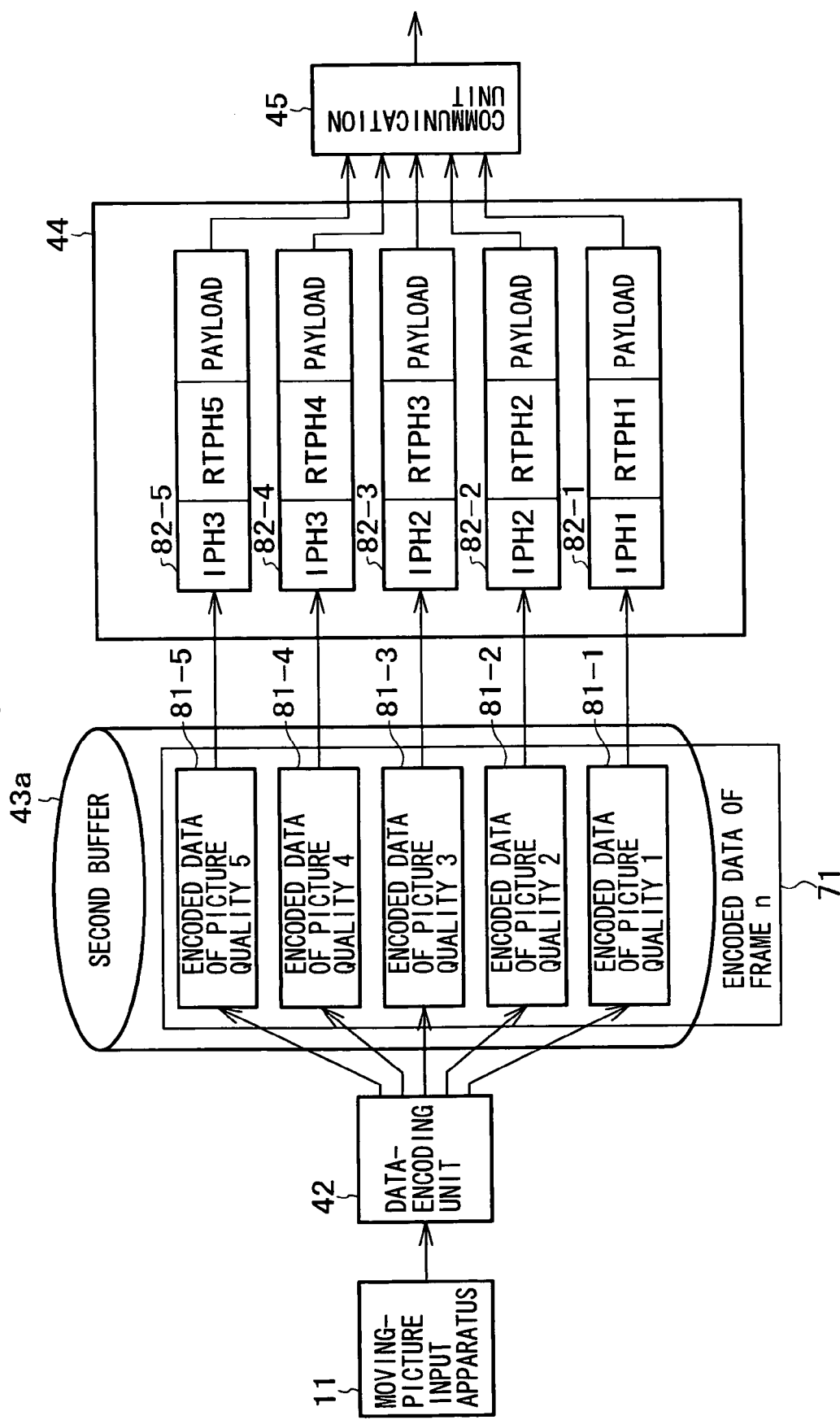
FIG. 5 is a diagram showing a typical structure of each packet obtained as a result of a packet generation process carried out by the moving-picture distribution apparatus shown in FIG. 3 on the basis of a picture quality.

By referring to FIGS. 4 and 5, the following description explains detailed operations to packetize each frame each created for each progressive order and attach an identifier to each of the packets.

In order to make the explanation simple, the explanation assumes for example that there are only two types of progressives, i.e. the spatial-resolution progressive and the picture-quality progressive.

In addition, it is also assumed that the data-encoding unit 42 is capable of carrying out a layered encoding process on N frames per second where notation N is any integer. The N frames are frames received from the moving-picture input apparatus 11.

Further, it is also assumed that numbers 0 to (N−1) have been respectively attached to the N frames received from the moving-picture input apparatus 11 in the same order the frames are received. In this case, for an attached number n satisfying the relation n %2=0 where notation n is an integer in the range 0 to (N−1) and notation n %2 denotes a remainder obtained as a result of division of n by 2, that is, for an even attached number n, the data-encoding unit 42 carries out a layered encoding process on a frame with the attached number n on the basis of the spatial resolution. For an attached number n satisfying the relation n %2=1, that is, for an odd attached number n, on the other hand, the data-encoding unit 42 carries out a layered encoding process on a frame with the attached number n on the basis of the picture quality.

To put it concretely, for n %2=0 representing even integers n, the data-encoding unit 42 carries out a layered encoding process on data of frame n received from the moving-picture input apparatus 11 on the basis of the spatial resolution and stores a result of the layered encoding process in a first buffer 43a as encoded data 51 of frame n as shown in FIG. 4. As described above, the attached number n is an integer in the range 0 to (N−1).

In the example shown in FIG. 4, the encoded data 51 of frame n is split into pieces of encoded data, which each correspond to one of typically five layers for the spatial resolution.

To put it in detail, the encoded data 51 of frame n can be considered to be an encoded-data group including pieces of encoded data 61-1 to 61-5. The encoded data 61-1 is encoded data for spatial resolution 1, which is the lowest spatial resolution. The encoded data 61-2 is encoded data for spatial resolution 2, which is a spatial resolution higher than spatial resolution 1 by 1 layer level. The encoded data 61-3 is encoded data for spatial resolution 3, which is a spatial resolution higher than spatial resolution 2 by 1 layer level. The encoded data 61-4 is encoded data for spatial resolution 4, which is a spatial resolution higher than spatial resolution 3 by 1 layer level. The encoded data 61-5 is encoded data for spatial resolution 5, which is the highest spatial resolution, higher than spatial resolution 4 by 1 layer level.

The packet generation unit 44 puts each of the pieces of encoded data 61-1 to 61-5 in a packet to generate packets 62-1 to 62-5. That is to say, the packet generation unit 44 generates a packet group consisting of the packets 62-1 to 62-5, supplying the packet group to the communication unit 45.

It is to be noted that, in the example shown in FIG. 4, the packets 62-1 to 62-5 are each an RTP packet. In an extension header of a packet 62-$p$, an identifier p corresponding to the spatial-resolution layer level of the encoded data 61-$p$ is set as a priority level where notation p denotes an integer in the range 1 to 5 and identifier p is the number p corresponding to spatial resolution p. That is to say, RTPHp is added to the extension header, which is an application-dependent header following the RTP header.

In addition, if the packets 62-1 to 62-5, which are each an RTP packet, are transferred by adoption of the IP protocol, they are each handled as an IP packet. In this case, in the IP header, a priority level determined in accordance with Table 1 shown below is set. That is to say, in the IP header, IPq is set where notation q denotes an integer in the range 1 to 3.

TABLE 1

| Layer | RTP header | IP header |
| --- | --- | --- |
| Layer 1 | 1 | 1 |
| Layer 2 | 2 | 2 |
| Layer 3 | 3 | 2 |
| Layer 4 | 4 | 3 |
| Layer 5 | 5 | 3 |

It is to be noted that the technique of associating a layer level of a layered encoding process with a priority level of an RTP level is described in Japanese Patent Laid-open No. 2001-197499 disclosing inventions, a patent of which was applied by the applicant for this patent.

The communication unit 45 selects packets corresponding to spatial resolution r from a packet group supplied thereto for a receiver terminal and transmits (or distributes) the selected packets to the receiver terminal. In this case, notation r is an integer in the range 1 to 5. For example, the communication unit 45 selects the packets 62-1 to 62-r corresponding to spatial resolution r for the user terminal 15a shown in FIG. 1 and transmits the selected packets 62-1 to 62-r to the user terminal 15a.

The user terminal 15a receives and decodes the packets 62-1 to 62-r to display a moving picture with spatial resolution r.

Thus, the user terminal 15a is capable of displaying the moving picture with spatial resolution 5, which is the highest spatial resolution, by receiving and decoding all packets of the packet group, that is, the packets 62-1 to 62-5.

Much like the case of n %2=0 described above, for n %2=1 representing odd integers n, the data-encoding unit 42 carries out a layered encoding process on data of frame n received from the moving-picture input apparatus 11 on the basis of the picture quality and stores a result of the layered encoding process in a second buffer 43b, which is a buffer different from the first buffer 43a shown in FIG. 4, as encoded data 71 of frame n as shown in FIG. 5. The data of frame n is the same picture data as frame (n−1). As described above, the attached number n is an integer in the range 0 to (N−1).

In the example shown in FIG. 5, the encoded data 71 of frame n is split into pieces of encoded data, which each correspond to one of typically five layers for the picture quality.

To put it in detail, the encoded data 71 of frame n can be considered to be an encoded-data group including pieces of encoded data 81-1 to 81-5. The encoded data 81-1 is encoded data for picture quality 1, which is the lowest picture quality. The encoded data 81-2 is encoded data for picture quality 2, which is a picture quality higher than picture quality 1 by 1 layer level. The encoded data 81-3 is encoded data for picture quality 3, which is a picture quality higher than picture quality 2 by 1 layer level. The encoded data 81-4 is encoded data for picture quality 4, which is a picture quality higher than picture quality 3 by 1 layer level. The encoded data 81-5 is encoded data for picture quality 5, which is a highest picture quality, higher than picture quality 4 by 1 layer level.

The packet generation unit 44 puts each of the pieces of encoded data 81-1 to 81-5 in a packet to generate packets 82-1 to 82-5. That is to say, the packet generation unit 44 generates a packet group consisting of the packets 82-1 to 82-5, supplying the packet group to the communication unit 45.

It is to be noted that, much like the packets 62-1 to 62-5 shown in FIG. 4, in the example shown in FIG. 5, the packets 82-1 to 82-5 are each an RTP packet. In an extension header of a packet 82-p, an identifier p corresponding to the picture-quality layer level of the encoded data 81-p is set as a priority level where notation p denotes an integer in the range 1 to 5 and identifier p is the number p corresponding to picture quality p. That is to say, RTPHp is added to the extension header.

In addition, much like the packets 62-1 to 62-5 shown in FIG. 4, if the packets 82-1 to 82-5 are transferred by adoption of the IP protocol, they are each handled as an IP packet. In this case, in the IP header, a priority level determined in accordance with Table 1 shown before is set. That is to say, in the IP header, IPq is set where q has a value in the range 1 to 3.

The communication unit 45 selects packets corresponding to picture quality r from a packet group supplied thereto for a receiver terminal and transmits (or distributes) the selected packets to the receiver terminal. In this case, notation r denotes an integer in the range 1 to 5. For example, the communication unit 45 selects the packets 82-1 to 82-r corresponding to picture quality r for the user terminal 15a shown in FIG. 1 and transmits the selected packets 82-1 to 82-r to the user terminal 15a.

The user terminal 15a receives and decodes the packets 82-1 to 82-r to display a moving picture with picture quality r.

Thus, the user terminal 15a is capable of displaying the moving picture with picture quality 5, which is the highest picture quality, by receiving and decoding all packets of the packet group, that is, the packets 82-1 to 82-5.

As described above, the moving-picture distribution apparatus 12 carries out a layered encoding process on each frame and packetizes a result of the layered encoding process to generate a packet group for each of a plurality of different progressive orders. Then, for each specific one of the different progressive orders, packets are selected from a packet group generated for the specific progressive order and distributed to a terminal adopting the specific progressive order.

Thus, the moving-picture distribution system shown in FIG. 1 is capable of distributing data of a moving picture at the same time from one server such as the moving-picture distribution apparatus 12 shown in FIG. 2 to a plurality of user groups specifying qualities different from each other. In the typical distribution shown in FIG. 2, the user groups are user groups 21 and 22.

To put it in detail, the moving-picture distribution system shown in FIG. 1 is capable of distributing specific data of the moving picture to a specific receiver terminal. An example of the specific terminal, in FIG. 2, is one of user terminals 15d and 15e included in the user group 21 or one of user terminals 15f and 15g included in the user group 22. The specific data of the moving picture is packets, which are selected from a packet group generated for a layer level of the spatial-resolution or picture-quality progressive order adopted by the specific terminal as packets for displaying the moving picture at a spatial resolution or a picture quality specified by the specific terminal. That is to say, the moving-picture distribution system shown in FIG. 1 is capable of distributing specific packets to any specific receiver terminal as moving-picture data proper for the capability of the receiver terminal and proper for the environment of a network connecting the receiver terminal to the moving-picture distribution apparatus 12.

The following description explains a concrete example of a packet distributed by the moving-picture distribution system shown in FIG. 1.

Figure 6:
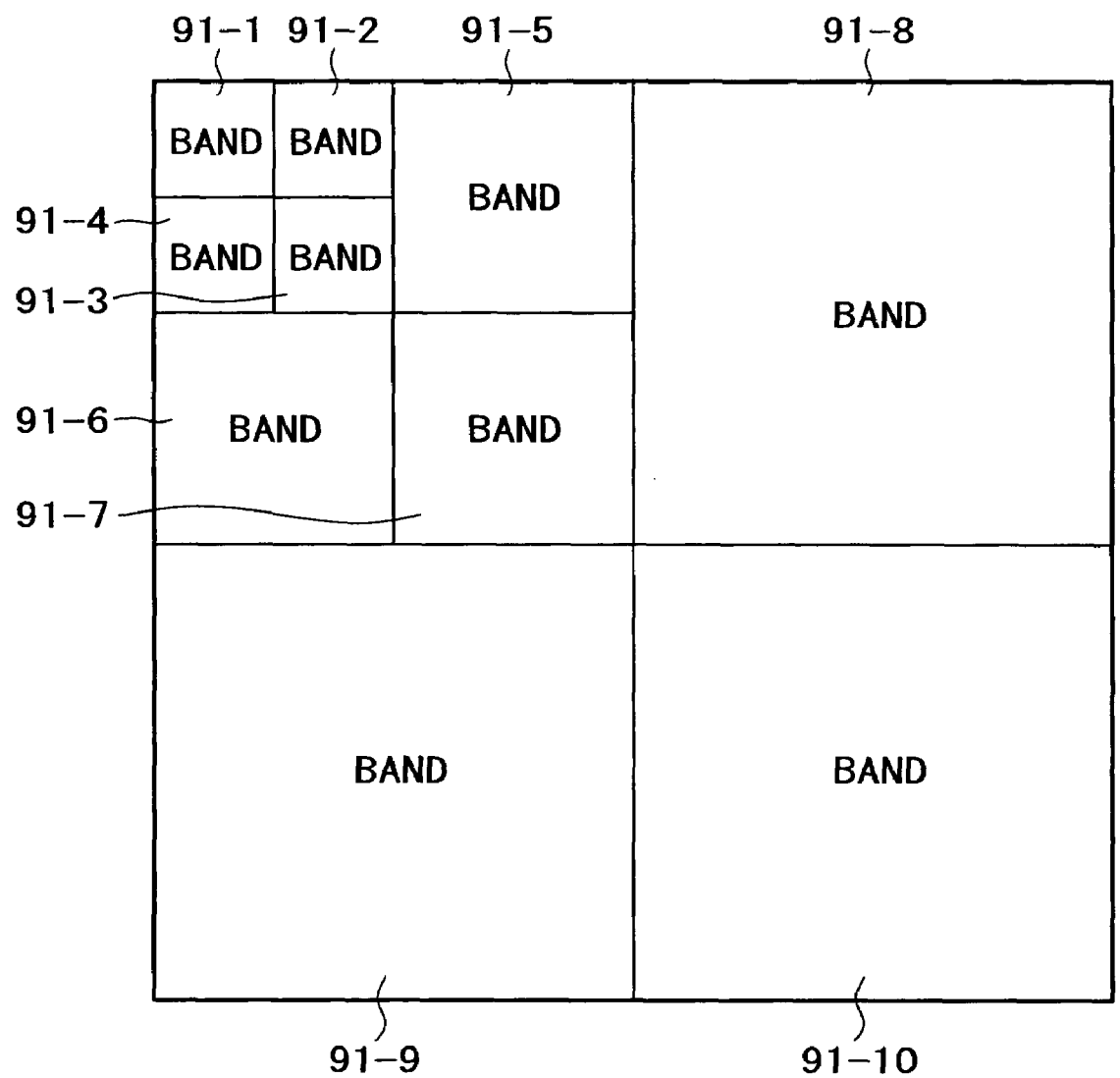
FIG. 6 is a diagram showing a typical configuration of a frame obtained as a result of a layered encoding process carried out by the moving-picture distribution apparatus shown in FIG. 3 on data of the frame by adoption of an encoding method utilizing wavelet transform.

FIG. 6 is a diagram showing a typical configuration of a frame, obtained as a result of a layered encoding process carried out by the data-encoding unit 42 shown in FIG. 3 on data of a frame on the basis of the spatial resolution by adoption of an encoding method utilizing the wavelet transform. The frame is divided into each corresponding levels.

To put it concretely, FIG. 6 is a diagram showing a result of a division process carried out 3 times on a frame by adoption of a wavelet-transform technique. The result of such a division process is stored in the first buffer 43a.

To put it in detail, the frame shown in FIG. 6 is divided by the data-encoding unit 42 into low bands 3LL of the highest level of importance, lower bands 2LL and lowest bands LL, which are then stored in the first buffer 43a. Assuming that the frame including bands 91-1 to 91-10 has a side size of 1, the low band 3LL such as a band 91-1 has a side size of ⅛, the lower band 2LL such as that consisting of bands 91-1 to 91-4 has a side size of ¼ and the lowest band LL such as that consisting of bands 91-1 to 91-7 has a side size of ½.

FIG. 7 is a diagram showing a typical configuration of layers for a case in which the packet generation unit 44 carries out a packet generation process on the frame shown in FIG. 6 for the spatial-resolution progressive order.

To put it in detail, the packet generation unit 44 generates a packet group consisting of packets arranged in an order shown in FIG. 7. The packet group starts with a packet 101-1 obtained as a result of a packet generation process carried out on the band 91-1. The packet 101-1 is followed by a packet 101-2 obtained as a result of a packet generation process carried out on the bands 91-2 to 92-4. The packet 101-2 is followed by a packet 101-3 obtained as a result of a packet generation process carried out on the bands 91-5 to 91-7. The packet 101-3 is followed by a packet 101-4 obtained as a result of a packet generation process carried out on the bands 91-8 to 91-10.

Thus, the picture of one frame is composed of a packet group consisting of the packets 101-1 to 101-4.

The packet 101-1 is transmitted from the moving-picture distribution apparatus 12 to a receiver terminal such as the user terminal 15a shown in FIG. 1 as a layer 102-1, which is then decoded by the user terminal 15a to produce a picture 103-1 with a spatial resolution of ⅛.

By the same token, the packets 101-1 and 101-2 are transmitted from the moving-picture distribution apparatus 12 to the user terminal 15a as a layer 102-2, which is then decoded by the user terminal 15a to produce a picture 103-2 with a spatial resolution of ¼.

In the same way, the packets 101-1 to 101-3 are transmitted from the moving-picture distribution apparatus 12 to the user terminal 15a as a layer 102-3, which is then decoded by the user terminal 15a to produce a picture 103-3 with a spatial resolution of ½.

Likewise, the packets 101-1 to 101-4 are transmitted from the moving-picture distribution apparatus 12 to the user terminal 15a as a layer 102-4, which is then decoded by the user terminal 15a to produce a picture 103-4 with a spatial resolution of 1.

Figure 8:
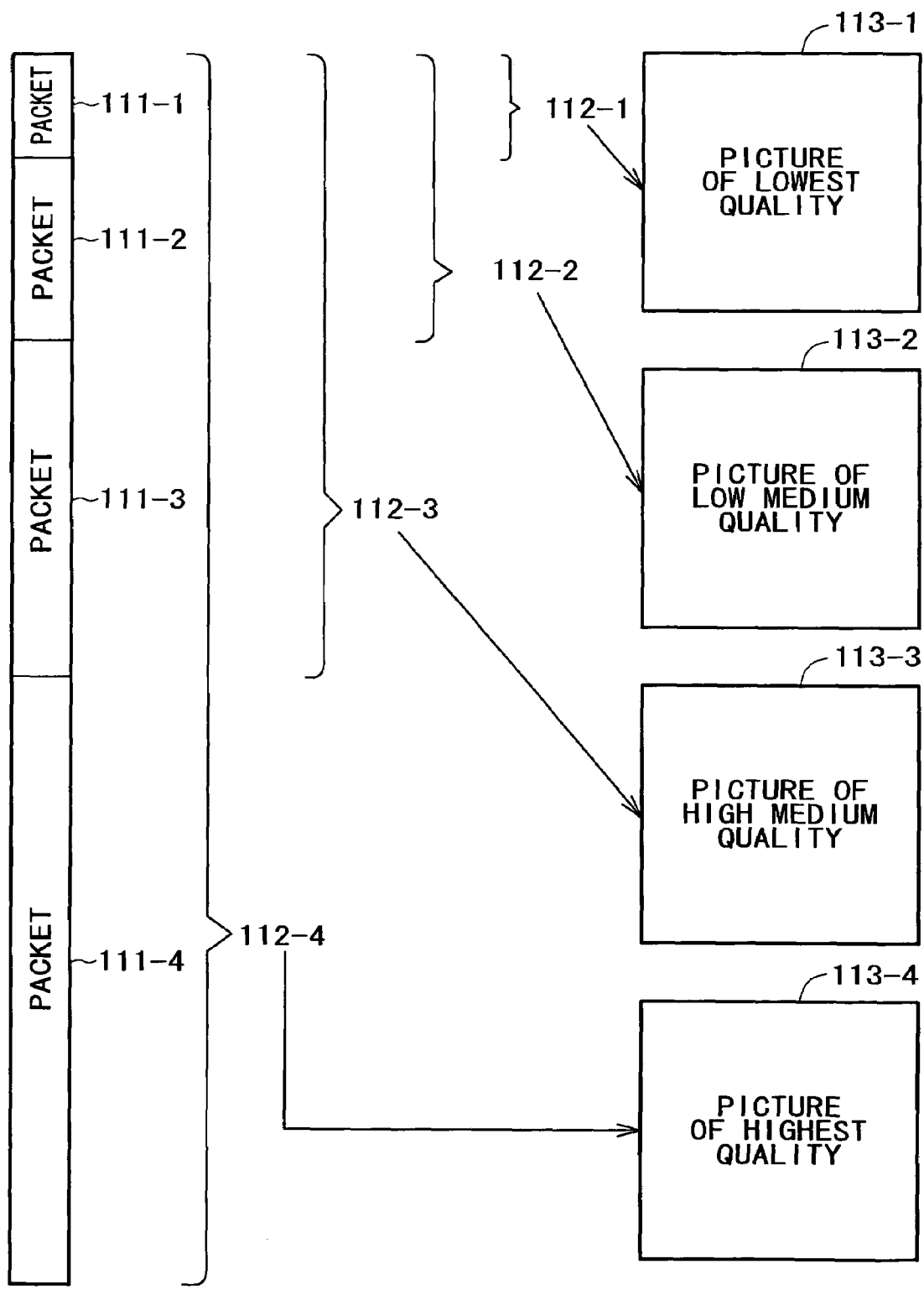
FIG. 8 is a diagram showing a typical configuration of layers for a case in which a packet generation process is carried out by the moving-picture distribution apparatus shown in FIG. 3 on the basis of a picture quality.

FIG. 8 is a diagram showing a typical configuration of layers for a case in which the packet generation unit 44 carries out a packet generation process on a result of a picture-quality based layered encoding process carried out by the data-encoding unit 42 on a frame stored in the second buffer 43b for the picture-quality progressive order.

In the packet generation process, the packet generation unit 44 generates a packet group consisting of packets 111-1 to 111-4. Thus, the picture of one frame is composed of a packet group consisting of the packets 111-1 to 111-4.

The packet 111-1 is transmitted from the moving-picture distribution apparatus 12 to the user terminal 15a as a layer 112-1, which is then decoded by the user terminal 15a to produce a picture 113-1 with a lowest picture quality.

By the same token, the packets 111-1 and 111-2 are transmitted from the moving-picture distribution apparatus 12 to the user terminal 15a as a layer 112-2, which is then decoded by the user terminal 15a to produce a picture 113-2 with a low medium picture quality, a level higher than the lowest picture quality.

In the same way, the packets 111-1 to 111-3 are transmitted from the moving-picture distribution apparatus 12 to the user terminal 15a as a layer 112-3, which is then decoded by the user terminal 15a to produce a picture 113-3 with a high medium picture quality a level higher than the low medium picture quality.

Likewise, the packets 111-1 and 111-4 are transmitted from the moving-picture distribution apparatus 12 to the user terminal 15a as a layer 112-4, which is then decoded by the user terminal 15a to produce a picture 113-4 with a highest picture quality.

Figure 9:
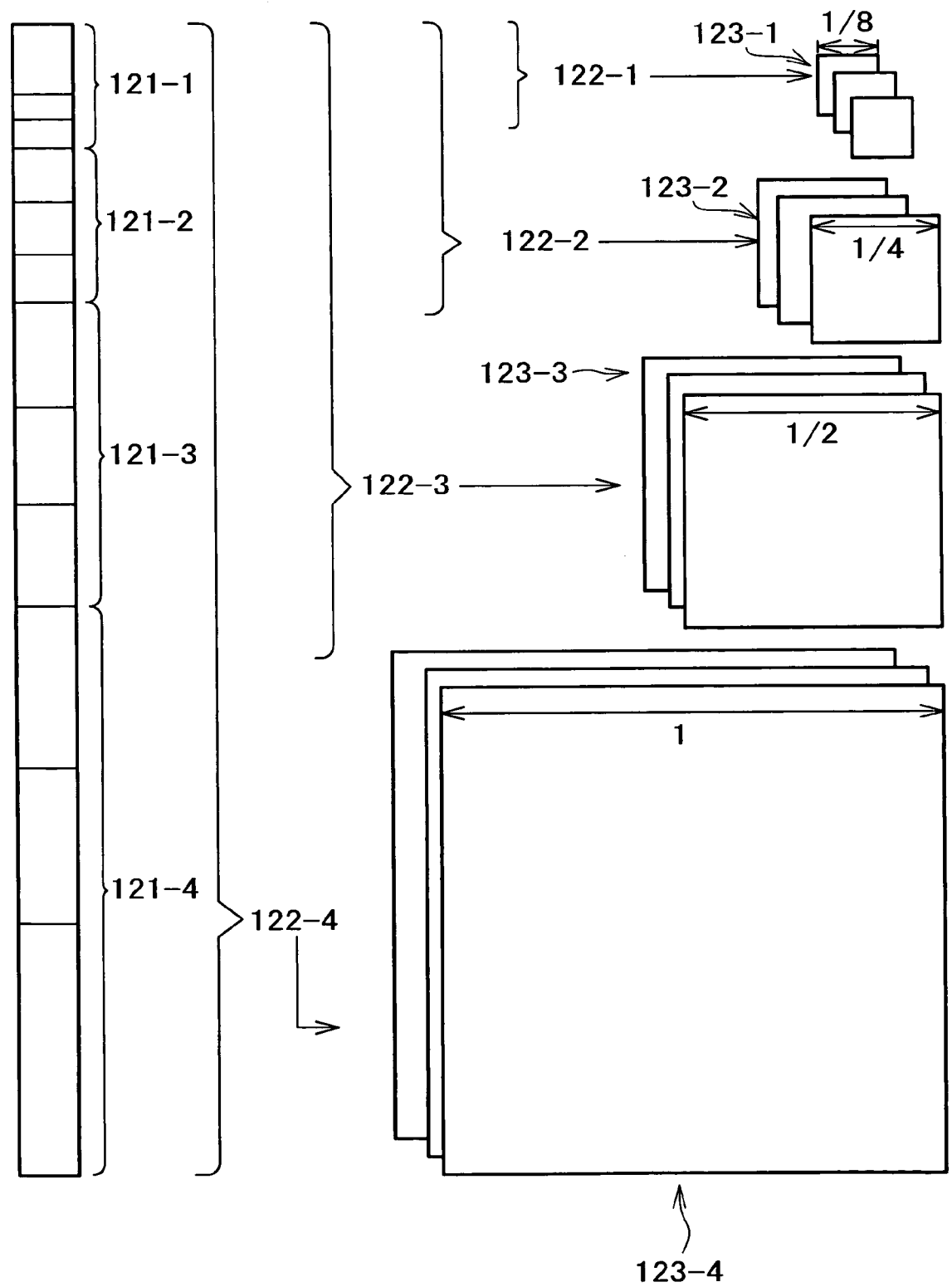
FIG. 9 is a diagram showing a typical configuration of layers for a case in which a packet generation process is carried out by the conventional moving-picture distribution apparatus on the basis of a combination of a spatial resolution and a picture quality.

FIG. 9 is a diagram showing a typical configuration of layers for a case in which a packet generation process is carried out by the conventional server functioning as the conventional moving-picture distribution apparatus on the basis of a combination of a spatial resolution and a picture quality for the purpose of comparison with the layer configurations shown in FIGS. 7 and 8.

In the typical layer configuration shown in FIG. 9, the picture of one frame includes packet groups 121-1 to 121-4. Each of the packet groups 121-1 to 121-4 includes 3 packets corresponding to picture qualities of 3 layer levels respectively. For example, let us refer the picture qualities of the 3 layer levels to picture qualities 1 to 3 respectively.

The packet group 121-1 is transmitted from the moving-picture distribution apparatus 12 to a receiver terminal such as the user terminal 15a shown in FIG. 1 as a layer 122-1, which is then decoded by the user terminal 15a to produce a picture group 123-1 with a spatial resolution of ⅛. The picture group 123-1 is a picture group consisting of 3 pictures having picture qualities 1, 2 and 3 respectively.

By the same token, the packet groups 121-1 and 121-2 are transmitted from the moving-picture distribution apparatus 12 to the user terminal 15a as a layer 122-2, which is then decoded by the user terminal 15a to produce a picture group 123-2 with a spatial resolution of ¼. The picture group 123-2 is a picture group consisting of 3 pictures having picture qualities 1, 2 and 3 respectively.

In the same way, the packet groups 121-1 to 121-3 are transmitted from the moving-picture distribution apparatus 12 to the user terminal 15a as a layer 122-3, which is then decoded by the user terminal 15a to produce a picture group 123-3 with a spatial resolution of ½. The picture group 123-3 is a picture group consisting of 3 pictures having picture qualities 1, 2 and 3 respectively.

Likewise, the packet groups 121-1 to 121-4 are transmitted from the moving-picture distribution apparatus 12 to the user terminal 15a as a layer 122-4, which is then decoded by the user terminal 15a to produce a picture group 123-4 with a spatial resolution of 1. The picture group 123-4 is a picture group consisting of 3 pictures having picture qualities 1, 2 and 3 respectively.

For example, if the user terminal 15a is a terminal of a type not capable of reproducing a picture with the highest picture quality, however, the user terminal 15a does not display a picture with the highest picture quality without regard to whether the received layer is layer 122-1, 122-2, 122-3 or 122-4.

In addition, if the user terminal 15a specifies the packet group consisting the layers 102-1 to 102-4 generated for the spatial-resolution progressive order like the ones shown in FIG. 7, any of the layers 122-1 to 122-4 cannot satisfy the specified packet group.

In order to solve this problem, in order for the conventional server functioning as a moving-picture distribution apparatus to transmit a packet to meet a request made by the user to a user terminal, the server must carry out a complicated process including an operation to select only the required packet from a plurality of packets composing the packet groups 121-1 to 121-4 shown in FIG. 9 and an operation to read out the selected packet from a buffer. This complicated process is a heavy burden borne by the server and a process requiring a long processing time.

As a result, the conventional moving-picture distribution system is not capable of distributing a moving picture at the same time, (that is, in a real-time manner), from one server to users specifying qualities different from each other.

On the other hand, as described above by referring to FIG. 7 or 8, the moving-picture distribution apparatus 12 shown in FIG. 1 arranges packets in a simple packet group and carries out a process to transmit packets proper for every user to the user. In the process to transmit packets to each user, for example, the moving-picture distribution apparatus 12 determines a packet group generated in accordance with a specified progressive order for each frame and transmits only packets selected from the determined packet group to a user group specifying a quality for the specified progressive order. Thus, the moving-picture distribution system shown in FIG. 1 is capable of providing a moving picture at the same time from one server functioning as the moving-picture distribution apparatus 12 to a plurality of user groups such as the user groups 21 and 22 shown in FIG. 2.

Next, a typical configuration of a receiver terminal is explained.

As described above, a receiver terminal basically includes: a communication unit for receiving packets as well as a sender report from the moving-picture distribution apparatus 12 shown in FIG. 1 through the network 13a and transmits a receiver report to the moving-picture distribution apparatus 12 by way of the network 13a; a decoding unit for decoding the packets received by the communication unit; and a display control unit for displaying the packets decoded by the decoding unit for each frame on a display unit. The receiver terminal can have any configuration as long as the configuration includes the communication unit, the decoding unit and the display control unit, which are listed above.

Typically, the receiver terminal has the configuration of a personal computer as is the case with the user terminal 15a and the user terminal 15b. As an alternative, the receiver terminal may also have the configuration of a cellular phone as is the case with the user terminal 15c.

Figure 10:
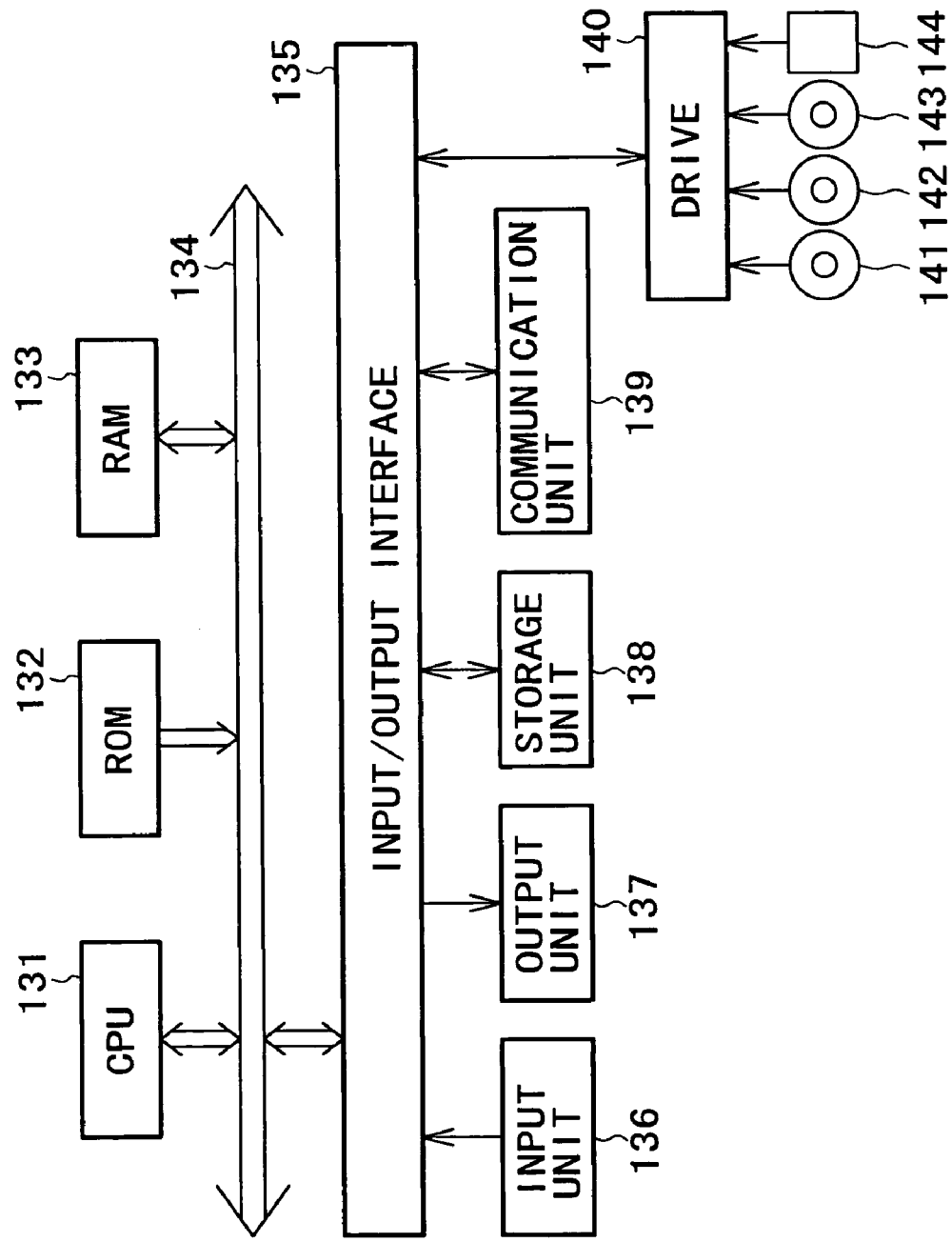
FIG. 10 is a diagram showing a typical configuration of a user terminal employed in the moving-picture distribution system shown in FIG. 1.

By referring to FIG. 10, the following description explains a receiver terminal having a typical configuration of a personal computer as is the case with the user terminal 15a.

In the typical configuration shown in FIG. 10, a CPU 131 carries out various kinds of processing by execution of programs stored in advance in a ROM 132 or programs loaded from a storage unit 138 into a RAM 133. The RAM 133 is also used for properly storing data required by the CPU 131 in the execution of the programs to carry out the various kinds of processing.

For example, as described above, the CPU 131 acquires a packet received by a communication unit 139 through an input/output interface 135 and a bus 134, decoding the packet. The CPU 131 then controls an output unit 137 to receive decoded packets of each frame transferred thereto by way of the bus 134 and the input/output interface 135 and display the packets on a display unit connected to the output unit 137.

In addition, as described above, the CPU 131 receives a sender report from the moving-picture distribution apparatus 12 through the communication unit 139, the input/output interface 135 and the bus 134, analyzing the report. Then, the CPU 131 generates a receiver report for the received sender report and transmits the receiver report to the moving-picture distribution apparatus 12 by way of the bus 134, the input/output interface 135 and the communication unit 139.

Further, as will be described later, the CPU 131 generates a setup request and a play request, transmitting them to the moving-picture distribution apparatus 12 by way of the bus 134, the input/output interface 135 and the communication unit 139. On the other hand, the CPU 131 also receives a setup-request response and a play-request response from the moving-picture distribution apparatus 12 through the communication unit 139, the input/output interface 135 and the bus 134, carrying out processes on these responses.

The CPU 131, the ROM 132 and the RAM 133 are connected to each other by the bus 134. The bus 134 is also connected to the input/output interface 135.

The input/output interface 135 is further connected to the input unit 136, the output unit 137, the storage unit 138 and the communication unit 139. The input unit 136 includes a keyboard and a mouse. The output unit 137 is connected to the display unit cited above. The storage unit 138 is typically a hard disk. The communication unit 139 is typically a modem or a terminal adapter. The communication unit 139 and the moving-picture distribution apparatus 12 communicate with each other through the network 13b and the network 13a.

If necessary, the input/output interface 135 is also connected to a drive 140 on which a magnetic disk 141, an optical disk 142, a magneto-optical disk 143 or a semiconductor memory 144 is mounted. A computer program is read out from the magnetic disk 141, the optical disk 142, the magneto-optical disk 143 or the semiconductor memory 144 and, if necessary, installed in the storage unit 138.

Figure 11:
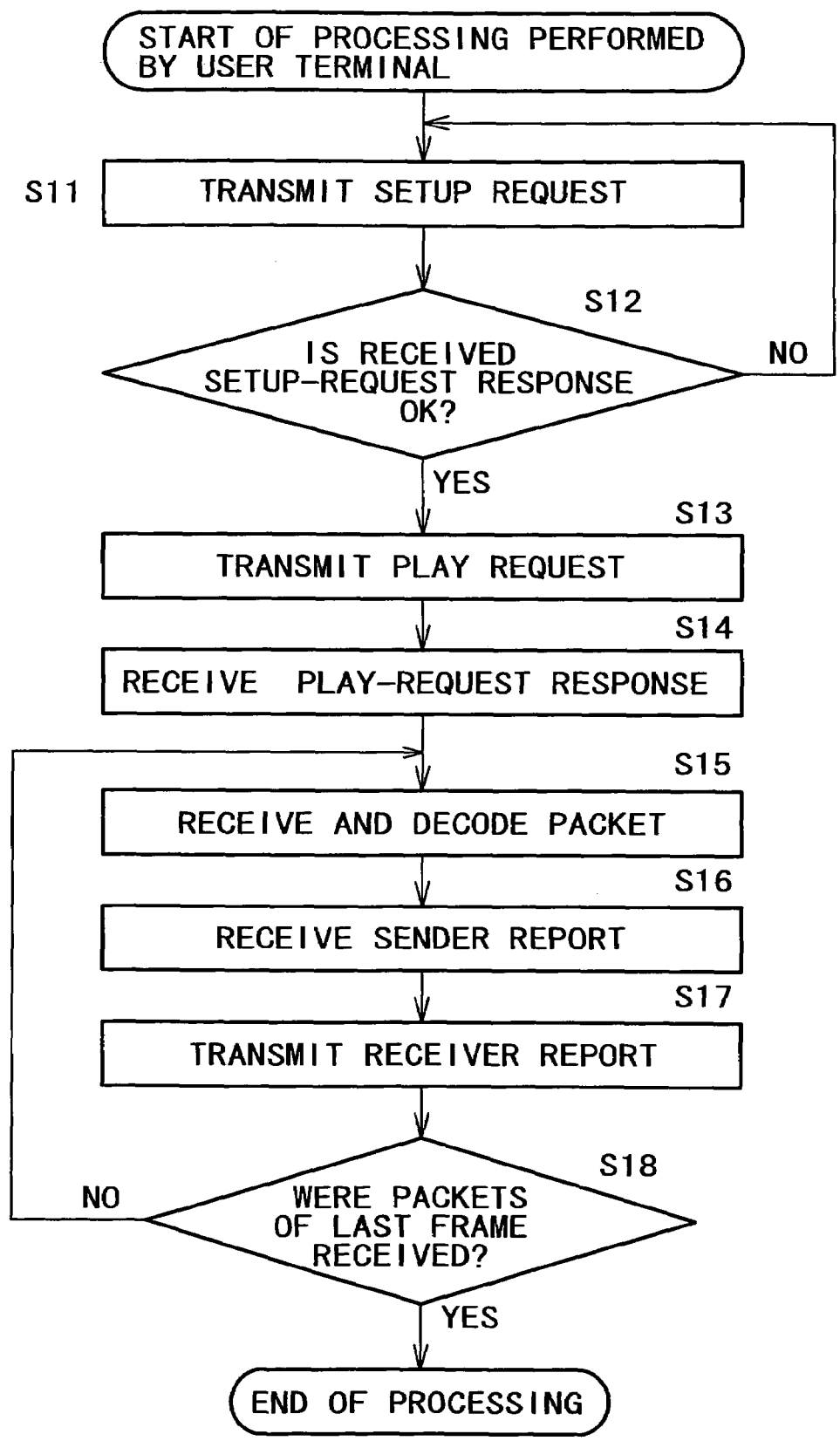
FIG. 11 shows a flowchart referred to in explanation of processing carried out by the user terminal shown in FIG. 10.
Figure 12:
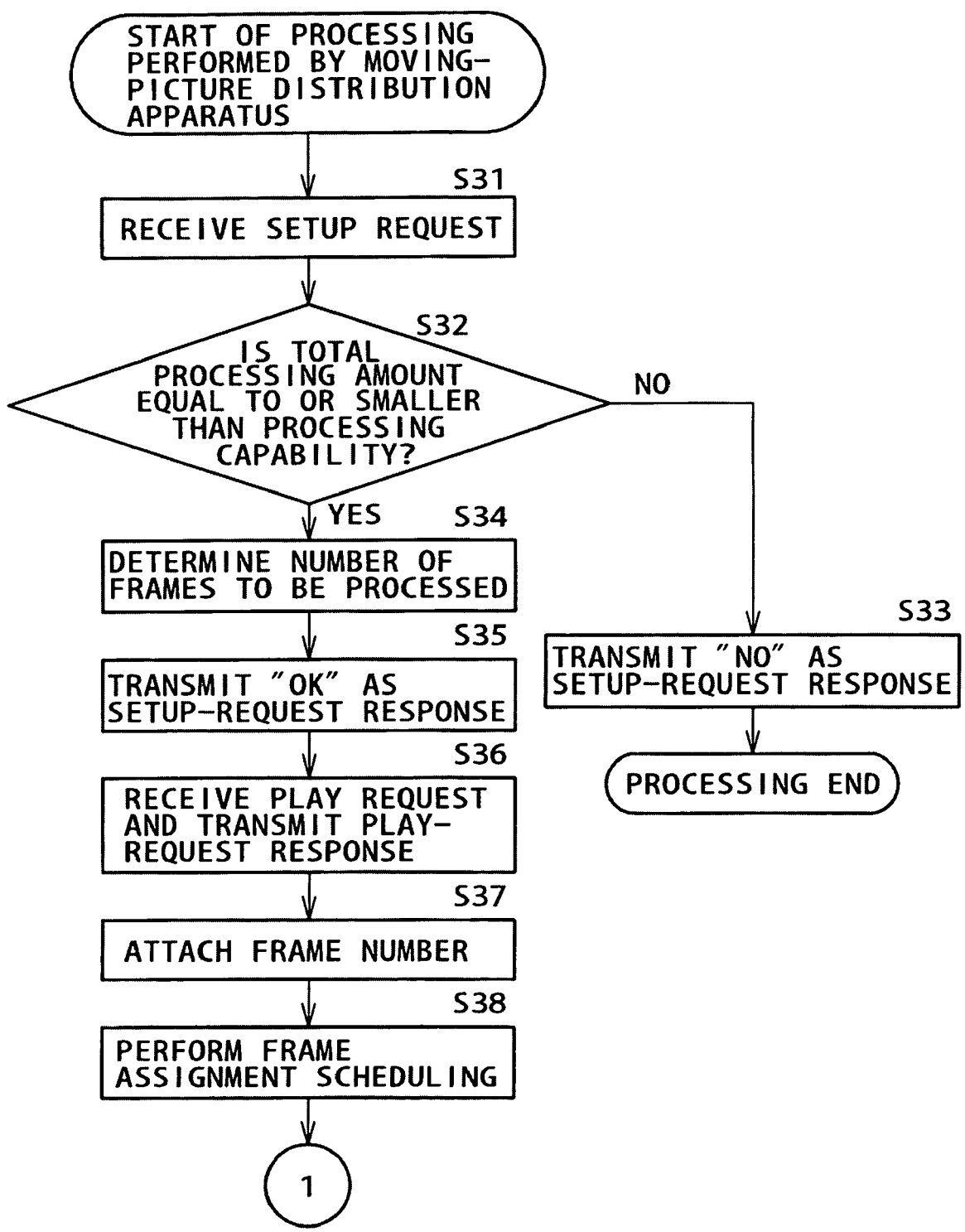
FIG. 12 shows a flowchart referred to in explanation of processing carried out by the moving-picture distribution apparatus shown in FIG. 3.
Figure 13:
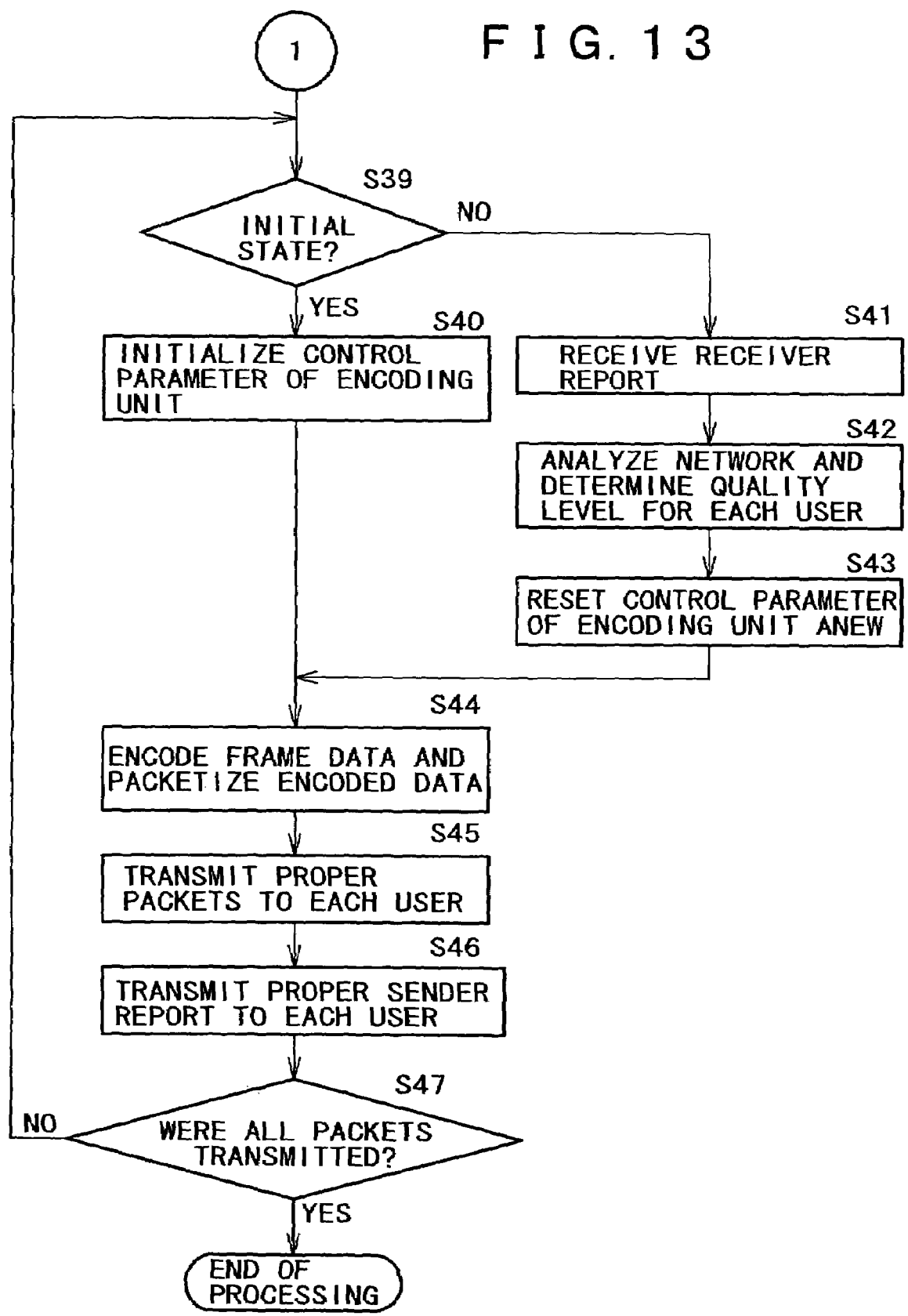
FIG. 13 shows a continuation flowchart referred to in explanation of the processing carried out by the moving-picture distribution apparatus shown in FIG. 3.

By referring to flowcharts shown in FIGS. 11, 12 and 13, the following description individually explains processes carried out by the user terminal 15a and the moving-picture distribution apparatus 12. A relation between the processing carried out by the user terminal 15a and the processing carried out by the moving-picture distribution apparatus 12 can be understood with ease by referring to steps shown in FIG. 14.

First of all, processing carried out by the user terminal 15a shown as an element of the moving-picture distribution system of FIG. 1 and shown in FIG. 10 is explained by referring to the flowchart shown FIG. 11. It is to be noted that some processing carried out by the user terminal 15a as a counterpart of the processing performed by the moving-picture distribution apparatus 12 will be explained later by referring to an arrow chart shown in FIG. 14. Even though the description explains only processing carried out by the user terminal 15a, other receiver terminals such as the user terminal 15b and the user terminal 15c can be assumed to basically carry out the same processing as the user terminal 15a.

At a step S11, the CPU 131 uses an RTSP (Real-Time Streaming Protocol) to generate data of a setup request and transmits the data to the moving-picture distribution apparatus 12 by way of the bus 134, the input/output interface 135 and the communication unit 139.

The data of a setup request is data specified by the user terminal 15a. The data of a setup request includes a quality such as a progressive, a specific one of layers for the progressive and the processing capability of the CPU 131. Examples of the progressive are the spatial-resolution progressive, the picture-quality progressive and the color-component progressive. The processing capability of the CPU 131 includes the number of frames that the CPU 131 is capable of encoding per second.

That is to say, the setup request corresponds to the QOS information cited before.

The data of the setup request output by the communication unit 139 is transmitted to the moving-picture distribution apparatus 12 by way of the network 13b and the network 13a.

As will be described later, the moving-picture distribution apparatus 12 generates a response data for the received data of the setup request and transmits the response data to the user terminal 15a by way of the network 13a and the network 13b at steps S31 to S35 of the flowchart shown in FIG. 12 and the arrow chart shown in FIG. 14. The response data is referred to hereafter as the data of a setup-request response.

Then, at the next step S12, the CPU 131 receives the data of a setup-request response supplied thereto by way of the communication unit 139, the input/output interface 135 and the bus 134, determining whether or not the received data of a setup-request response is OK data.

If the determination result produced in the processing carried out at the step S12 indicates that the received data of a setup-request response is not OK data, that is, the received data of a setup-request response is NO data, the user terminal 15a determines that the moving-picture distribution apparatus 12 is not capable of rendering a moving-picture service for the setup request. In this case, the flow of the processing goes back to the step S11 at which another setup request is transmitted to the moving-picture distribution apparatus 12.

If the determination result produced in the processing carried out at the step S12 indicates that the received data of a setup-request response is OK data, on the other hand, the moving-picture distribution apparatus 12 is considered to be capable of rendering a moving-picture service. In this case, the flow of the processing goes on to a step S13 at which the CPU 131 uses the RTSP to generate data of a play request and transmit the data to the moving-picture distribution apparatus 12 by way of the bus 134, the input/output interface 135 and the communication unit 139.

The data of the play request output by the communication unit 139 is transmitted to the moving-picture distribution apparatus 12 by way of the network 13b and the network 13a.

As will be described later, the moving-picture distribution apparatus 12 generates a response data for the received data of the play request and transmits the response data to the user terminal 15a by way of the network 13a and the network 13b at a step S36 of the flowchart shown in FIG. 12 and the arrow chart shown in FIG. 14. The response data is referred to hereafter as the data of a play-request response.

Then, at the next step S14, the CPU 131 receives the data of a play-request response supplied thereto by way of the communication unit 139, the input/output interface 135 and the bus 134, entering a wait state till next data such as a packet to be described later is received.

In the mean time, as will be described later, the moving-picture distribution apparatus 12 carries out a layered encoding process on data of a moving picture in frame units and packetizes a result of the layered encoding process on the basis of a quality specified by the user terminal 15a, that is, on the basis of the setup-request data, to generate a packet group. Then, the moving-picture distribution apparatus 12 transmits packets included in the packet group as packets generated for the user terminal 15a to the user terminal 15a by way, of the network 13a and the network 13b at steps S37 to S45 of the flowcharts shown in FIGS. 12 and 13 as well as the arrow chart shown in FIG. 14.

Then, at the next step S15, the CPU 131 receives and decodes the packets supplied thereto by way of the communication unit 139, the input/output interface 135 and the bus 134. Subsequently, the CPU 131 supplies decoded packets of every frame to the output unit 137 by way of the bus 134 and the input/output interface 135 to be displayed on the display unit.

Figure 14:
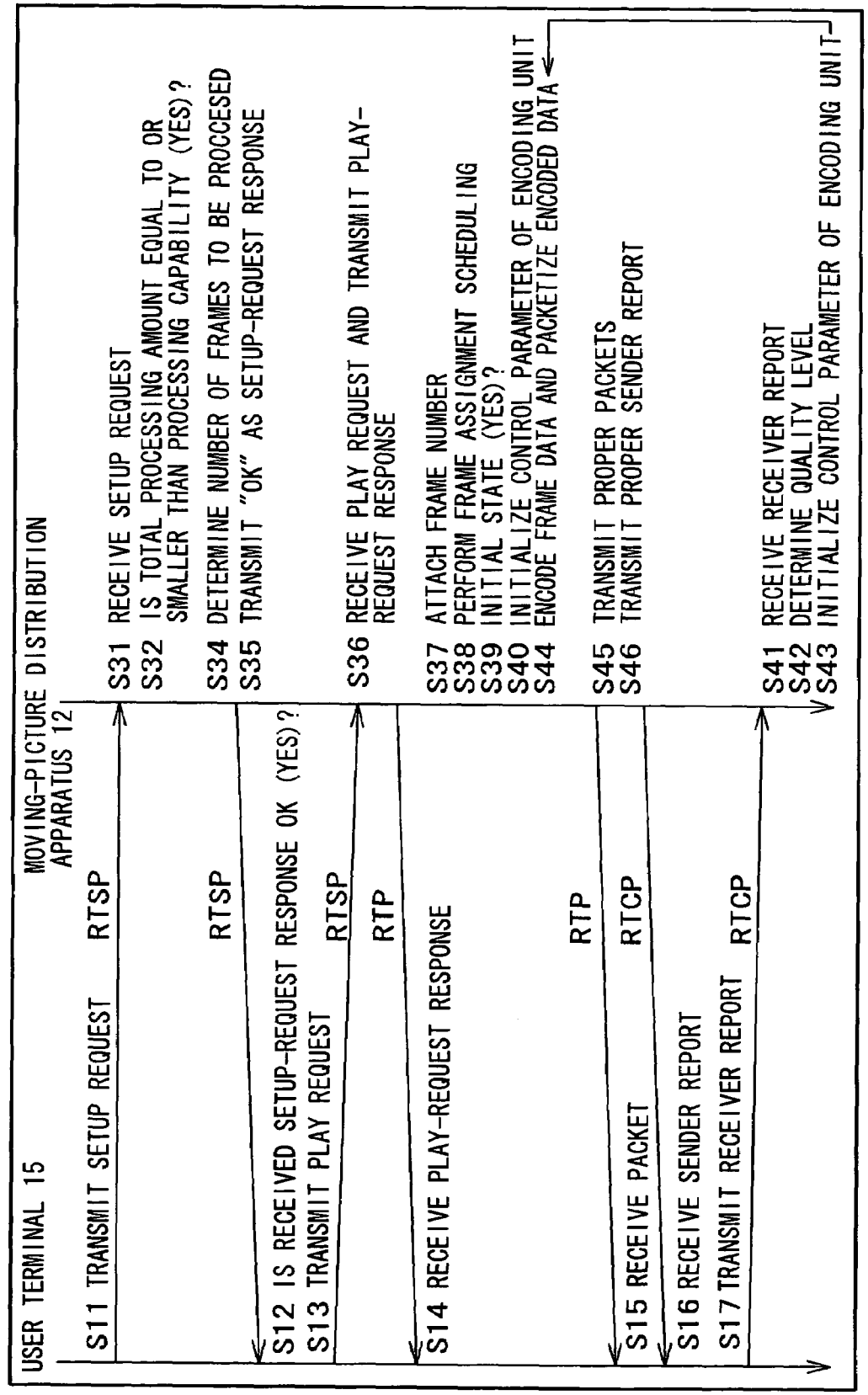
FIG. 14 shows an arrow chart representing a relation between the user terminal shown in FIG. 10 and the moving-picture distribution apparatus shown in FIG. 3.

In the mean time, on the basis of the RTCP, the moving-picture distribution apparatus 12 generates data of a sender report and transmits the data to the user terminal 15a by way of the network 13a and the network 13b at a step S46 of the flowchart shown in FIG. 13 as well as the arrow chart shown in FIG. 14 at fixed intervals. The sender report includes a timestamp and the number of transmitted packets.

Then, at the next step S16, the CPU 131 receives the data of the sender report supplied thereto by way of the communication unit 139, the input/output interface 135 and the bus 134. Subsequently, at the step S17, on the basis of the RTCP, the CPU 131 generates data of a receiver report for the received sender report and transmits the data to the moving-picture distribution apparatus 12 by way of the bus 134, the input/output interface 135 and the communication unit 139. The receiver report typically includes information on the packet loss rate and information on the number of lost packets.

The data of the receiver report output from the communication unit 139 is transmitted to the moving-picture distribution apparatus 12 by way of the network 13b and the network 13a.

As will be described later, on the basis of the data of the received sender report, the moving-picture distribution apparatus 12 analyzes the state of the network 13a and dynamically executes quality control to change setting data of the data-encoding unit 42 and the number of frames to be transmitted by the data-encoding unit 42 to packetize every subsequent frame and transmit proper packets to the user terminal 15a by way of the network 13a and the network 13b at steps S41 to S45 of the flowchart shown in FIG. 13 and the arrow chart shown in FIG. 14.

Then, at the next step S18, the CPU 131 determines whether or not packets of the last frame have been received. If packets of the last frame have not been received, the flow of the processing goes back to the step S15 to repeat the processing at this step and the subsequent steps.

That is to say, when the CPU 131 receives a packet supplied thereto by the moving-picture distribution apparatus 12 by way of the communication unit 139, the input/output interface 135 and the bus 134, the CPU 131 decodes the packet and outputs decoded packets of every frame to the output unit 137 by way of the bus 134 and the input/output interface 135 to be displayed on the display unit.

If the determination result produced in the processing carried out at the step S18 indicates that packets of the last frame have been received, on the other hand, the CPU 131 ends the processing.

Next, processing carried out by the moving-picture distribution apparatus 12 shown as an element of the moving-picture distribution system of FIG. 1 and shown in FIG. 3 is explained by referring to the flowchart shown in FIGS. 12 and 13. It is to be noted that some of the processing carried out by the moving-picture distribution apparatus 12 as a counterpart of the processing performed by the user terminal 15a is explained by referring to the arrow chart shown in FIG. 14.

As described above, in the processing carried out at the step S11 of the flowchart shown in FIG. 11 and the arrow chart shown in FIG. 14, the user terminal 15a generates data of a setup request and transmits the data to the moving-picture distribution apparatus 12 by way of the network 13b and the network 13a.

At a step S31 of the flowchart shown in FIG. 12, the main control unit 41 receives the data of the setup request supplied thereto by way of the communication unit 45 and the network-monitoring/analyzing unit 46.

At that time, the main control unit 41 is capable of receiving data of setup requests with requested qualities different from each other from a plurality of other receiver terminals such as the user terminals 15b and 15c. It is to be noted that the number of receiver terminals or the number of users is not limited.

Assume for example that the data of the setup request received from the user terminal 15a includes information specifying the spatial resolution as a progressive and a frame-processing rate of 30 frames per second.

Also assume that the data-encoding unit 42 is capable of encoding data at a maximum encoding speed of 60 frames per second.

Then, at the next step S32, on the basis of pieces of setup-request data received from a plurality of receiver terminals including the user terminal 15a, the main control unit 41 determines whether or not the total amount of data processing to be carried out is not greater than the processing capability of the data-encoding unit 42. If the total amount of data processing to be carried out is determined to be neither smaller than nor equal to the processing capability of the data-encoding unit 42, that is, if the total amount of data processing to be carried out is determined to be greater than the processing capability of the data-encoding unit 42, the flow of the processing goes on to a step S33 at which the main control unit 41 uses the RTSP to generate NO data as data of a setup-request response and outputs the data to the network 13a by way of the communication unit 45. The NO data is data indicating that the moving-picture distribution apparatus 12 is not capable of rendering a service for the setup request.

If the main control unit 41 determines that the total amount of data processing to be carried out is not greater than the processing capability of the data-encoding unit 42 at the step S32, on the other hand, the flow of the processing goes on to a step S34 at which the number of frames to be processed in one second is determined.

Assume for example that, in this embodiment, there are 2 user groups each specifying a frame-processing rate of 30 frames per second, and one of the user groups specifies the spatial-resolution progressive while the other user group specifies the picture-quality progressive. Also assume that the main control unit 41 determines the number of frames to be processed in one second to be 60.

It is to be noted that the user group specifying the spatial resolution is assumed to include the user terminal 15a.

Also assume that the moving-picture input apparatus 11 of a camera or the like supplies 30 frames per second to the data-encoding unit 42. In this case, for every frame, the data-encoding unit 42 is capable of carrying out a layered encoding process in the two different progressive orders, i.e., the spatial-resolution progressive order and the picture-quality progressive order. Thus, as a result of the layered encoding process carried out on one frame, the data-encoding unit 42 is capable of outputting a total of two frames completing the layered encoding process.

Then, at the next step S35, the main control unit 41 uses the RTSP to generate OK data as data of a setup-request response and outputs the data to the network 13a by way of the communication unit 45. The OK data is data indicating that the moving-picture distribution apparatus 12 is capable of rendering a service for the setup request.

It is to be noted that, if the moving-picture distribution apparatus 12 transmits packets of a picture to the user terminal 15a, the user terminal 15a recognizes that the moving-picture distribution apparatus 12 is capable of rendering a requested service. Thus, in actuality, the processing carried out at the step S35 is not a mandatory process.

The OK data or NO data of the setup-request response output from the communication unit 45 is transmitted to the user terminal 15a by way of the network 13a and the network 13b.

As described above, in the processing carried out at the step S12 of the flowchart shown in FIG. 11 or the arrow chart shown in FIG. 14, the user terminal 15a determines whether the data of the received setup-request response is OK or NO. If the user terminal 15a determines that the data of the received setup-request response is OK, at the step S13, the user terminal 15a generates a play request and transmits the request to the moving-picture distribution apparatus 12 by way of the network 13b and the network 13a.

Then, at the next step S36, the main control unit 41 receives the data of the play request supplied thereto by way of the communication unit 45 and the network-monitoring/analyzing unit 46. Subsequently, the main control unit 41 uses the RTSP to generate data of a play-request response and outputs the data to the network 13a by way of the communication unit 45.

As described above, in the processing carried out at the step S14 of the flowchart shown in FIG. 11 or the arrow chart shown in FIG. 14, the data of the play-request response output from the communication unit 45 is transmitted to the user terminal 15a by way of the network 13a and the network 13b.

Then, at the next step S37, the main control unit 41 attaches a frame number to every piece of data of the encoded frame.

In this embodiment, since 60 frames are processed each second, the frame number is also incremented by 60 every second.

Then, at the next step S38, the main control unit 41 carries out frame assignment scheduling. In this scheduling, the main control unit 41 determines which receiver terminal or which user group and which progressive order every frame is to be assigned to. As described above, every frame has a frame number assigned thereto in the processing carried out at the step S37.

In this embodiment, for example, the user terminal 15a specifies a frame-processing rate of 30 frames per second and the spatial resolution. Thus, the main control unit 41 assigns every frame having an even frame number to the user terminal 15a or a user group including the user terminal 15a as explained earlier by referring to the embodiment shown in FIG. 4.

It is to be noted that, if the user group including the user terminal 15a also includes other receiver terminals, for example, every fourth frame among the frames each having an even number can be assigned to one of the other receiver terminals that specifies a lower frame-processing rate.

In addition, as explained earlier by referring to the embodiment shown in FIG. 5, it is assumed that, in this embodiment, the main control unit 41 assigns frames each having an odd frame number to a user group specifying the picture quality.

Further, it is assumed that, in this embodiment, in addition to the aforementioned assignment of frames to user groups, packets are also assigned to layers each representing a quality level.

Assume for example that the layer levels of the spatial resolution are expressed by spatial resolutions 1 to 5 as shown in FIG. 4. In this case, if the user terminal 15a specifies spatial resolution 3, the main control unit 41 assigns packets 62-1 to 62-3 to the user terminal 15a. The packets 62-1 to 62-3 are packets obtained as a result of a packet generation process carried out on encoded data 61-1 of spatial resolution 1 to encoded data 61-3 of spatial resolution 3 respectively.

At a step S39 of the flowchart shown in FIG. 13, the main control unit 41 determines whether or not the moving-picture distribution apparatus 12 is in an initial state.

Assume for example that the moving-picture distribution apparatus 12 has not transmitted (or distributed) any packets yet to a receiver terminal. In this case, at the step S39, the main control unit 41 determines that the moving-picture distribution apparatus 12 is in an initial state so that the flow of the processing goes on to a step S40 at which a control parameter of the data-encoding unit 42 is initialized on the basis of data processed in the processing carried out at the step S38.

It is to be noted that, in this embodiment, for example, every frame is subjected to an encoding process alternately changing the progressive from one of two progressives, i.e. the spatial resolution and the picture quality, to another and vice versa.

Then, at the next step S44, the data-encoding unit 42 encodes data of every frame, and the packet generation unit 44 puts each piece of data obtained as a result of the layered encoding process in a packet.

For example, the data-encoding unit 42 carries out a layered encoding process on data of a frame with an even frame number by adoption of the Motion JPEG2000 encoding method on the basis of the spatial resolution and stores a result of the layered encoding process in the first buffer 43a. As described earlier, a frame with an even frame number is a frame supplied by the moving-picture input apparatus 11 as a frame assigned to the user terminal 15a, and the Motion JPEG2000 encoding method is an encoding method utilizing the wavelet transform.

That is to say, the data-encoding unit 42 stores the encoded frame data 51 consisting of encoded data 61-1 to encoded data 61-5 as shown in FIG. 4 in the first buffer 43a.

The packet generation unit 44 puts each of the encoded data 61-1 to encoded data 61-5 in an RTP packet as well as an IP packet to generate a packet group consisting of packets 62-1 to 62-5.

It is to be noted that, in an extension header of a packet 62-p, the main control unit 41 sets an identifier p corresponding to the spatial resolution layer level of the encoded data 61-p as a priority level where notation p denotes an integer in the range 1 to 5 and identifier p is the integer p corresponding to spatial resolution p. That is to say, RTPHp is added to the extension header. In addition, in the IP header, a priority level determined in accordance with Table 1 is set. That is to say, in the IP header of the packet 62-p, IPq is set where q is an integer in the range 1 to 3.

Then, at the next step S45, the main control unit 41 transmits (distributes) packets of a packet group generated in the processing carried out at the step S44 for every user to a receiver terminal of the user by way of the communication unit 45.

For example, the main control unit 41 distributes the packets 62-1 to 62-3 shown in FIG. 4 to the user terminal 15a by way of the communication unit 45. The packets 62-1 to 62-3 shown in FIG. 4 are packets set in the processing carried out at the step S38.

As described before, the packets 62-1 to 62-3 are transmitted to the user terminal 15a by way of the network 13a and the network 13b to be decoded by the user terminal 15a in the processing carried out at the step S15 of the flowchart shown in FIG. 11 and the arrow chart shown in FIG. 14.

Then, at the next step S46, as described earlier, the main control unit 41 utilizes the RTCP to generate data of a sender report including a timestamp as well as the number of transmitted packets for every receiver terminal, and transmits the report to the terminal by way of the communication unit 45 at fixed intervals.

For example, as described earlier, data of a sender report for the user terminal 15a is transmitted to the user terminal 15a by way of the network 13a and the network 13b and received by the user terminal 15a in the processing carried out at the step S16 of the flowchart shown in FIG. 11 and the arrow chart shown in FIG. 14 whereas data of a receiver report for the sender report is transmitted from the user terminal 15a in the processing carried out at the step S17 of the flowchart shown in FIG. 11 and the arrow chart shown in FIG. 14.

Then, at the following step S47, the main control unit 41 determines whether or not all packets have been transmitted. If the main control unit 41 determines that all packets have not been transmitted, the flow of the processing goes back to the step S39 at which the moving-picture distribution apparatus 12 is determined to be not in an initial state. In this case, the flow of the processing goes on to a step S41 at which the network-monitoring/analyzing unit 46 receives the receiver report supplied thereto by way of the network 13b, the network 13a and the communication unit 45.

It is to be noted that, at the step S41, the network-monitoring/analyzing unit 46 also receives receiver reports from other receiver terminals.

Then, at the following step S42, the network-monitoring/analyzing unit 46 analyzes the state of the network 13a on the basis of the receiver reports received at the step S41 and supplies a result of analysis to the main control unit 41.

The main control unit 41 determines a quality level for every user terminal serving as a receiver terminal on the basis of the analysis result.

That is to say, since every receiver report includes an RTP-packet loss rate and number of lost packets for the RTCP, the network-monitoring/analyzing unit 46 is capable of monitoring the congestion state of the network 13a on the basis of the information included in every receiver report. Thus, the network-monitoring/analyzing unit 46 is capable of finding a bandwidth for transmission to every user terminal used as a receiver terminal and supplies the bandwidths to the main control unit 41.

In addition, the network-monitoring/analyzing unit 46 monitors and analyzes RTCP packets, supplying a result of analysis to the main control unit 41.

The main control unit 41 determines a quality level for every user terminal used as a receiver terminal on the basis of the received bandwidth for transmission to every user terminal used as a receiver terminal and the received analysis result of the RTCP packets.

For example, the analysis result indicates that the user terminal 15a needs to lower its bit rate now. In this case, the main control unit 41 lowers the quality level of the user terminal 15a by one grade, that is, the main control unit 41 lowers the quality level to spatial resolution 2, hence determining to reduce the number of packets to be transmitted to the user terminal 15a.

To put it concretely, a quality level is controlled in accordance with Eq. (1) given below or Eq. (2) to be described later.

$$(\text{Next}) \text{ quality} = (\text{Demanded quality band}) \times (1-\rho) \quad (1)$$

where notation p denotes a packet loss rate.

Figure 15:
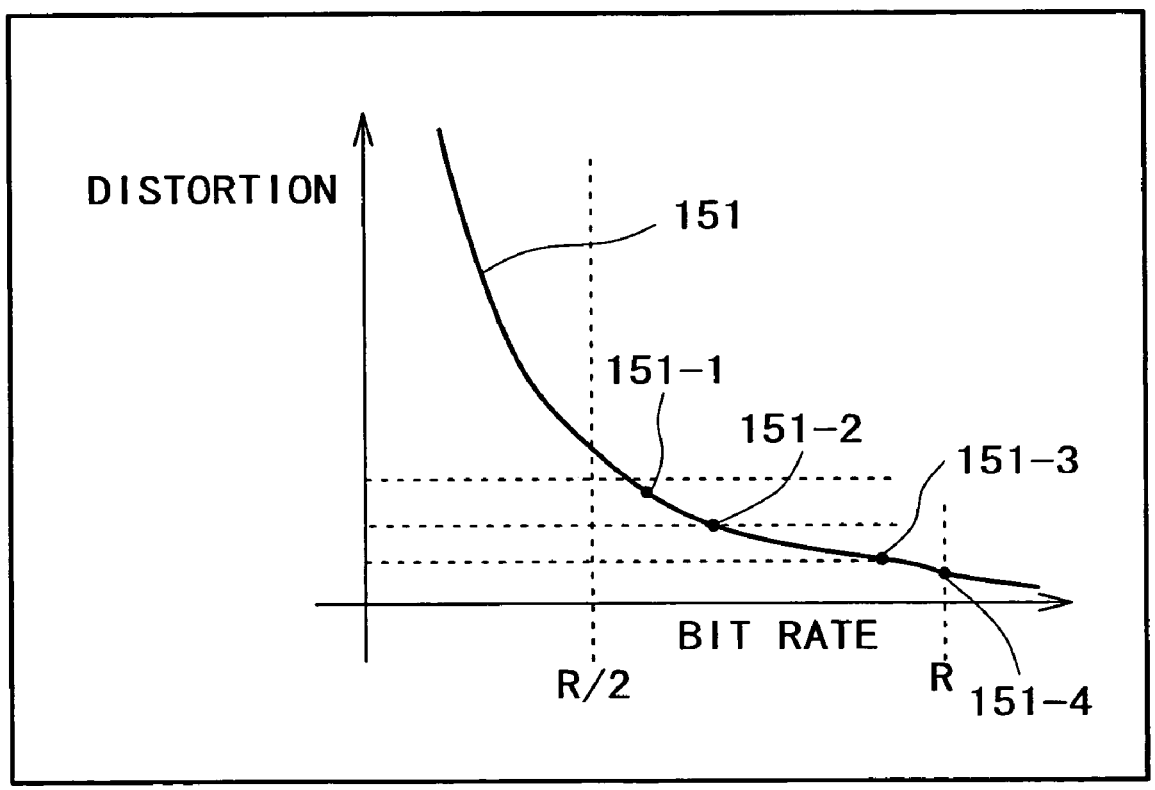
FIG. 15 is a diagram showing a typical curve used by the moving-picture distribution apparatus shown in FIG. 3 for controlling a picture-quality level with respect to a receiver terminal.

FIG. 15 is a diagram showing typical control of a picture-quality level for a case in which the picture quality is set at 3 layer levels. The typical control is typical control based on Eq. (1) or Eq. (2) to be described later. The vertical axis represents the degree of distortion or the degree of picture-quality deterioration whereas the horizontal axis represents the bit rate.

As is obvious from a curve 151, for low packet-loss rates ρ, the distortion does not change much even if the bit rate changes. At low packet-loss rates, for example, the main control unit 41 determines a point close to any of points representing a representative picture quality and uses the determined point as a representative value of the picture quality. The point 151-4 of (1−ρ) R, where notation R denotes the value of the bit rate, is determined to be a point close to any of the points representing the representative picture quality. In the case of the curve 151 shown in FIG. 15, the points representing the representative picture quality are points 151-1 to 151-3 and the point 151-4 is determined to be a point close to the point 151-3. Thereby the value corresponding to the point 151-3 is used for the point representing the representative picture quality.

It is to be noted that, in this embodiment, a picture quality of 3 stages is set. Thus, on the curve shown in FIG. 15, the 3 points 151-1 to 151-3 are taken as points used as representative values of the picture quality. It is to be noted, however, that the number of points that can be used as representative values of the picture quality is not limited to three.

In addition, for packet loss rates exceeding 50%, the degree of distortion drops abruptly. Thus, in order to increase the number of possibilities that the quality is highly appreciated by the user, reducing the number of frames is preferred to lowering the picture quality. In this case, the quality level is controlled in accordance with Eq. (2) as follows:

$$(\text{Next}) \text{ Frame count} \approx (\text{Frame count}) \times (1\rho) \quad (2)$$

Refer back to the flowchart shown in FIG. 13. At a step S43, the main control unit 41 resets the control parameter of the data-encoding unit 42 on the basis of the quality level set in the processing carried out at the step S42.

It is to be noted that the control parameter is a bit rate set in accordance with Eq. (1) as the bit rate of the data-encoding unit 42 or a frame count set in accordance with Eq. (2) as the number of frames to be processed per second.

Then, at the steps S44 to S46, on the basis of the newly set control parameter, the data-encoding unit 42 encodes data of every frame, the packet generation unit 44 packetizes data obtained as a result of the layered encoding process and the main control unit 41 transmits (distributes) the packets for every user to a receiver terminal of the user.

Assume for example that the quality level of the user terminal 15a is determined to be quality 2 at the step S42 described above. In this case, the main control unit 41 transmits the packets 62-1 and 62-2 shown in FIG. 4 to the user terminal 15a. As described earlier, the packet 62-1 is a result of a packet generation process to put encoded data 61-1 of spatial resolution 1 in a packet and the packet 62-2 is a result of a packet generation process to put encoded data 61-2 of spatial resolution 2 in a packet.

As the main control unit 41 determines at the step S47 that all packets have been transmitted, the processing is ended.

As described above, the moving-picture distribution system provided by the present invention as shown in FIG. 1 is capable of transmitting a moving picture at the same time from one server functioning as the moving-picture distribution apparatus 12 to a number of receiver terminals such as the user terminals 15a to 15c specifying qualities different from each other.

In addition, the data-encoding unit 42 employed in the server functioning as the moving-picture distribution apparatus 12 is capable of carrying out a layered encoding process on data of a moving picture in frame units by changing the progressive order for each frame. Thus, the server functioning as the moving-picture distribution apparatus 12 is capable of transmitting a moving picture to a plurality of receiver terminals of users, which specify qualities different from each other, by merely carrying out a small amount of processing such as a process to select only packets required by every receiver terminal and transmit the selected packets to each of the receiver terminals.

Further, the data-encoding unit 42 is capable of carrying out a layered encoding process based on wavelet transform. Thus, the server functioning as the moving-picture distribution apparatus 12 can be used as a base for constructing a system for scalable distributing a moving picture in a real-time manner to receiver terminals.

Furthermore, the server functioning as the moving-picture distribution apparatus 12 is capable of monitoring the network 13a and controlling a control parameter of the data-encoding unit 42 in accordance with the congestion state of the network 13a. Thus, the server functioning as the moving-picture distribution apparatus 12 is capable of distributing a moving picture with an optimum quality to receiver terminals.

The processing of the moving-picture distribution apparatus 12 described above can be carried out by using hardware or by using only software.

In this case, a moving-picture distribution apparatus 161 is typically implemented by a personal computer, a typical configuration of which is shown in FIG. 16.

In the typical configuration shown in FIG. 16, a CPU 171 carries out various kinds of processing by execution of programs stored in advance in a ROM 172 or programs loaded from a storage unit 178 into a RAM 173. The RAM 173 is also used for properly storing data required in the execution of the programs by the CPU 171 to carry out the various kinds of processing.

The CPU 171, the ROM 172 and the RAM 173 are connected to each other by a bus 174. The bus 174 is also connected to an input/output interface 175.

The input/output interface 175 is further connected to an input unit 176, an output unit 177, the storage unit 178 and a communication unit 179. The input unit 176 includes a keyboard and a mouse. The output unit 177 is connected to a display unit. The storage unit 178 is typically a hard disk. The communication unit 179 is typically a modem or a terminal adapter. The communication unit 179 and receiver terminals communicate with each other through a network. In the case of the moving-picture distribution system shown in FIG. 1, the network is the network 13a, which is the Internet.

That is to say, the CPU 171 carries out a layered encoding process on data of a moving picture in access units and packetizes a result of the layered encoding process to generate a packet group, which is then stored in typically the RAM 173.

Then, the CPU 171 determines packets needed by a receiver terminal serving as a target of packet distribution, reads out the determined packets from the RAM 173 and outputs the packets to the network 13a by way of the bus 174, the input/output interface 175 and the communication unit 179.

If necessary, the input/output interface 175 is also connected to a drive 180 on which a magnetic disk 191, an optical disk 192, a magneto-optical disk 193 or a semiconductor memory 194 is mounted. A computer program is read out from the magnetic disk 191, the optical disk 192, the magneto-optical disk 193 or the semiconductor memory 194 and, if necessary, installed in the storage unit 178.

If a series of processes described above is to be carried out by executing a variety of programs composing the software, the programs are installed typically from a network or recording media into a computer including embedded special-purpose hardware. Such programs can also be installed into a general-purpose personal computer capable of carrying out a variety of functions by execution of the installed programs.

As shown in FIG. 16, the removable recording medium, from which the programs are to be installed into the computer or the personal computer, can be the magnetic disk 191 including a floppy disk, the optical disk 192 including a CD-ROM (Compact Disk Read-Only Memory) and a DVD (Digital Versatile Disk), the MO (magneto-optical) disk 193 including an MD (mini disk) or the semiconductor memory 194 to mention a few. Instead of installing the programs into a computer or a personal computer from a network or recording media, the programs can also be distributed to the user by storing the programs in advance typically in an embedded recording medium such as the ROM 172 and/or the hard disk such as the storage unit 178, which are incorporated in the computer or the personal computer.

It is to be noted that, in this specification, steps prescribing a program stored in a recording medium can of course be executed sequentially along the time axis in a predetermined order. It is also worth noting, however, that the steps do not have to be executed sequentially along the time axis in a predetermined order. Instead, the steps may include pieces of processing to be carried out concurrently or individually.

In addition, a system in this specification means the entire system including processing means and a plurality of apparatus.

INDUSTRIAL APPLICABILITY

As described above, in accordance with the present invention, it is possible to distribute a moving picture having picture qualities each suitable for a user to each of a plurality of users specifying the picture qualities different from each other at the same time.

The invention claimed is:

1. A moving-picture distribution system comprising:
a moving-picture distribution apparatus, comprising:
means for encoding a moving picture according to spatial resolution;
means for encoding the moving picture according to signal-to-noise ratio (SNR);
means for packetizing the encoded moving picture;
means for generating a first packet group containing the moving picture encoded according to spatial resolution, the first packet group including a plurality of layers corresponding to different spatial resolutions of the moving picture;
means for generating a second packet group containing the moving picture encoded according to SNR, the second packet group including a plurality of layers corresponding to different signal-to-noise ratios of the moving picture; and
means for selectively transmitting a layer in the first packet group or a layer in the second packet group, selected in a message from a receiver terminal;
a first receiver terminal, comprising:
means for sending a first message to the moving-picture distribution apparatus selecting a first layer in the first packet group;
means for receiving the selected first layer in the first packet group from the moving-picture distribution apparatus; and
means for decoding the received first layer in the first packet group; and
a second receiver terminal, comprising:
means for sending a second message to the moving-picture distribution apparatus selecting a second layer in the second packet group;
means for receiving the selected second layer in the second packet group from the moving-picture distribution apparatus; and
means for decoding the received second layer in the second packet group,
wherein the means for selectively transmitting transmits the selected first layer of the first packet group to the first receiver terminal, and transmits the selected second layer of the second packet group to the second receiver terminal.

2. A moving-picture distribution system according to claim 1, wherein the means for encoding uses a progressive encoding method.

3. A moving-picture distribution system according to claim 2, wherein the progressive encoding method includes a wavelet transform.

4. A moving-picture distribution system according to claim 3, wherein the wavelet transform includes Motion JPEG2000.

5. A moving-picture distribution system according to claim 3, wherein at least one of the first and second receiver terminals further selects at least one of a spatial-resolution format, a picture quality format, and a color-component format.

6. A moving-picture distribution system according to claim 5, wherein at least one of the first and second receiver terminals further selects a decoding capacity of the means for decoding.

7. A moving-picture distribution system according to claim 1, wherein the first packet group and the second packet group include RTP packets.

8. A moving-picture distribution system according to claim 1, wherein:
the moving-picture distribution apparatus and the first and second receiver terminals are connected by a network;
the moving-picture distribution apparatus further includes means for monitoring a state of the network; and
the means for encoding encodes the moving picture based on the monitored state of the network.

9. A moving-picture distribution system according to claim 8, wherein the means for transmitting and the means for receiving use an IPv4 or an IPv6 network layer.

10. A moving-picture distribution apparatus for distributing a moving picture to first and second receiver terminals, the apparatus comprising:
means for encoding a moving picture according to spatial resolution;
means for encoding the moving picture according to signal-to-noise-ratio (SNR);
means for packetizing the encoded moving picture;

means for generating a first packet group containing the moving picture encoded according to spatial resolution, the first packet group including a plurality of layers corresponding to different spatial resolutions of the moving picture;

means for generating a second packet group containing the moving picture encoded according to SNR, the second packet group including a plurality of layers corresponding to different signal to noise ratios of the moving picture;

means for receiving, from the first receiver terminal, a first message selecting a first layer in the first packet group and, from the second terminal, a second message selecting a second layer in the second racket group; and means for selectively transmitting, to the first receiver terminal, the selected first layer in the first packet group and, to the second receiver terminal, the selected second layer in the second packet group.

11. A moving-picture distribution method for a moving-picture distribution apparatus which distributes a moving picture to first and second receiver terminals, the method comprising:

encoding a moving picture according to spatial resolution;

encoding the moving picture according to signal-to-noise ratio (SNR);

packetizing the encoded moving picture;

generating a first packet group containing the moving picture encoded according to spatial resolution, the first packet group including a plurality of layers corresponding to different spatial resolutions of the moving picture;

generating a second packet group containing the moving picture encoded according to SNR, the second packet group containing a plurality of layers corresponding to different signal-to-noise ratios of the moving picture;

receiving, from the first receiver terminal, a first message selecting a first layer of the first packet group;

receiving, from the second terminal, a second message selecting a second layer of the second packet group;

selectively transmitting the selected first layer of the first packet group to the first receiver terminal; and selectively transmitting the selected second layer of the second packet group to the second receiver terminal.

12. A computer-readable medium storing a computer program which, when executed by a moving-picture distribution apparatus, causes the moving-picture distribution apparatus to execute a method for distributing a moving picture to a receiver terminal, the method comprising:

encoding a moving picture according to spatial resolution;

encoding the moving picture according to signal-to-noise ratio (SNR);

packetizing the encoded moving picture;

generating a first packet group containing the moving picture encoded according to spatial resolution, the first packet group including a plurality of layers corresponding to a different spatial resolutions of the moving picture;

generating a second packet group containing the moving picture encoded according to SNR, the second packet group containing a plurality of layers corresponding to different signal-to-noise ratios of the moving picture;

receiving, from the first receiver terminal, a first message selecting a first layer of the first packet group;

receiving, from the second terminal, a second message selecting a second layer of the second packet group;

selectively transmitting the selected first layer of the first packet group to the first receiver terminal; and selectively transmitting the selected second layer of the second packet group to the second receiver terminal.

* * * * *

UNITED STATES PATENT AND TRADEMARK OFFICE
CERTIFICATE OF CORRECTION

PATENT NO. : 7,639,882 B2
APPLICATION NO. : 10/504840
DATED : December 29, 2009
INVENTOR(S) : Eisaburo Itakura It is certified that error appears in the above-identified patent and that said Letters Patent is hereby corrected as shown below:

On the title page, item (57), line 2, "mediums," should read --medium,--.

In claim 9, column 30, line 59, "lPv4 or an lPv6" should read --IPv4 or an IPv6--.

In claim 10, column 31, line 14, "racket" should read --packet--.

Signed and Sealed this

Twentieth Day of April, 2010

David J. Kappos
*Director of the United States Patent and Trademark Office*